(12) United States Patent
Schreiber et al.

(10) Patent No.: US 8,490,387 B2
(45) Date of Patent: Jul. 23, 2013

(54) METHOD FOR IMPROVING THE LIGHT-OFF OR REGENERATION BEHAVIOR OF AN AFTERTREATMENT DEVICE IN A VEHICLE SYSTEM

(75) Inventors: Gert Schreiber, Kirchheim a.d. Wstr. (DE); Volker Joergl, Breitenfurt (AT)

(73) Assignee: BorgWarner Inc., Auburn Hills, MI (US)

( * ) Notice: Subject to any disclaimer, the term of this patent is extended or adjusted under 35 U.S.C. 154(b) by 12 days.

(21) Appl. No.: 13/264,765

(22) PCT Filed: Apr. 19, 2010

(86) PCT No.: PCT/US2010/031536
§ 371 (c)(1),
(2), (4) Date: Oct. 17, 2011

(87) PCT Pub. No.: WO2010/123787
PCT Pub. Date: Oct. 28, 2010

(65) Prior Publication Data
US 2012/0036847 A1 Feb. 16, 2012

Related U.S. Application Data

(60) Provisional application No. 61/171,113, filed on Apr. 21, 2009.

(51) Int. Cl.
*F01N 3/00* (2006.01)
*F02D 23/00* (2006.01)

(52) U.S. Cl.
USPC .............................................. 60/284; 60/602

(58) Field of Classification Search
USPC ........................................ 60/284, 287, 297
See application file for complete search history.

(56) References Cited

U.S. PATENT DOCUMENTS

| | | | |
|---|---|---|---|
| 6,272,860 B1 * | 8/2001 | Klein et al. | 60/602 |
| 6,354,078 B1 * | 3/2002 | Karlsson et al. | 60/274 |
| 2002/0088428 A1 * | 7/2002 | Abo et al. | 123/295 |
| 2002/0134072 A1 * | 9/2002 | Fujieda et al. | 60/280 |
| 2004/0055283 A1 * | 3/2004 | Iihoshi et al. | 60/284 |
| 2005/0109029 A1 | 5/2005 | Busch | |
| 2006/0059910 A1 * | 3/2006 | Spaeder et al. | 60/612 |
| 2007/0056274 A1 | 3/2007 | Wills | |
| 2008/0209889 A1 | 9/2008 | Scheinert | |
| 2008/0223023 A1 | 9/2008 | Robel | |

FOREIGN PATENT DOCUMENTS

JP 11311118 A * 11/1999

* cited by examiner

*Primary Examiner* — Kenneth Bomberg
*Assistant Examiner* — Jason Shanske
(74) *Attorney, Agent, or Firm* — William G. Anderson; Stephan A. Pendorf; Patent Central LLC

(57) ABSTRACT

The process of active DPF regeneration requires that the DPF be brought to regeneration temperatures in excess of 550° C. to 600° C. for a period of time sufficient to accomplish soot burnoff in the DPF. Similarly, during cold start up it is desirable to bring the catalyst to light off temperature as soon as possible. The large thermal inertia of one or more turbochargers delays the exhaust gas at the DPF from reaching critical temperature quickly. The incorporation of a low thermal inertia, insulated, turbocharger bypass duct avoids thermal energy loss from exhaust gas to the turbine housing and shortens the time for the DPF to reach critical temperature for active DPF regeneration, or in the case of a catalytic converter, shortens time for catalyst to reach light off temperature.

12 Claims, 17 Drawing Sheets

METHOD FOR IMPROVING THE LIGHT-OFF OR REGENERATION BEHAVIOR OF AN AFTERTREATMENT DEVICE IN A VEHICLE SYSTEM

FIELD OF THE INVENTION

This invention is directed to a vehicle engine system including after-treatment devices, and in particular, to the bypass of components with large thermal inertia to aid in, e.g., early catalyst light-off and the regeneration of the after-treatment devices.

BACKGROUND OF THE INVENTION

Turbochargers are a type of forced induction system. They deliver compressed air to the engine intake, allowing more fuel to be combusted, thus boosting the engine's horsepower without significantly increasing engine weight. This can allow for the use of a smaller turbocharged engine, replacing a normally aspirated engine of a larger physical size, thus reducing the mass and aerodynamic frontal area of the vehicle. Turbochargers use the exhaust flow from the engine to drive a turbine, which in turn, drives the air compressor. To supply air outside of the capabilities of a simple system, the turbocharger system may take on various configurations.

Turbochargers consist of five major component groups. A section of a typical turbocharger is shown in FIG. 1. This turbocharger consists of a turbine housing (1) which is connected to a bearing housing (5). On the opposite end of the bearing housing is a compressor cover (2). The bearing housing supports a rotor assembly which consists of a turbine wheel (3) and a compressor wheel (4). The turbine housing is usually cast in a material from the ductile cast iron family, the bearing housing is usually cast in gray iron and the compressor cover is usually cast in an alloy of aluminum. The mass of a typical commercial Diesel size turbine housing is approximately 17 kg. These turbine housings have typical wall thicknesses of 5 to 6 mm. This is approximately 65% of the total mass of the turbocharger. The bearing housing is another 4 kg which makes the mass of the turbine housing, plus bearing housing, 85% of the total mass.

To achieve more boost, series or multiple stage turbochargers, where a first stage (low pressure) compressor discharges into the inlet of the next (high pressure) downstream compressor, which then further boosts the already compressed air to an even higher level, are used. Series turbochargers can have multiple stages but for the sake of clarity this discussion will discuss only two stage configurations, as that is the highest number used in common production in passenger car and commercial Diesel engines. The ratio "turbine housing plus bearing housing mass" to "total turbocharger weight" for multiple turbochargers will be a ratio similar of that for single turbochargers, so for example where the mass of turbine housing plus bearing housing of two turbochargers will be approximately 34 kg, this will still be 85% of the total mass of the turbochargers.

The thermal inertia of a body is a bulk material property related to the thermal conductivity, density and volumetric heat capacity of a material. Thermal inertia is used to describe the ability of a geometric body to come to thermal equilibrium when subjected to a change in its thermal environment. The resultant, in the context of an engine system, is the time it takes a geometrically defined body to change temperature. Masses being equal, a material with high thermal inertia will take more time to change temperature than a material of low thermal inertia. In the case of two objects of the same material but with different mass, the object with more mass will have more thermal inertia than the object with smaller mass (just as a cubic meter of cast iron will take longer to come to temperature equilibrium than would a cubic millimeter). In the context of the present invention, the term "thermal inertia" is used to describe the inherent dynamic temperature filtration, i. e., the relatively slow coming to equilibrium from an initial temperature differential existing between the exhaust gases and the material in the engine and the exhaust system. This thermal inertia is in turn due to the heat transfer between gas and wall material, the volumetric heat capacity of the material, which involves the thermal conductivity of the material, the specific heat and the density of the material and the thermal effect of the surrounding media (e.g. air, water and material).

The thermal inertia of a body is calculated by the formula:

$$\text{Thermal Inertia} = \kappa \cdot \rho \cdot C$$

Where $\kappa$=the bulk thermal conductivity of the material in $\text{Wm}^{-1}\cdot\text{K-1}$ and $\rho$=the density of the material in $\text{Kg m}^{-3}$ and C=the specific heat capacity in $\text{J}\cdot\text{kg}^{-1}\cdot\text{K}^{-1}$ The units are tiu.

In a calculation of thermal inertia, for a given material, for example cast iron, the specific heat and density will remain a constant. Therefore the thermal inertia is proportional to the bulk thermal conductivity of the material.

Since thermal conductivity is a measure of the quantity of heat transmitted over a period of time $\Delta t$, through a material of thickness Y and area A, across a temperature change of $\Delta T$, with a heat energy change of $\Delta Q$, the thermal conductivity $\kappa$ can be calculated through the formula:

$$\kappa = \frac{\Delta Q \cdot Y}{\Delta t \cdot A \cdot \Delta T}$$

If in this discussion the amount of heat energy supplied and the temperature change $\Delta T$ are considered to be constants, the variables are then the area of the material "wetted" by the exhaust gas, the thickness "Y" in a direction perpendicular to the plane of the area "A" of the material, and the time "t" for the body to come to thermal equilibrium. In turbine housings and other similar castings the actual thickness of the thinnest sections is often driven by foundry practices. In turbine housings, the technical requirement for material thickness is less than the casting practice minimum which is in the regime of 6 mm to 8 mm. This means that over the myriad of features in a turbine housing, the surface area "A" is the predominant variable which determines a change in thermal inertia.

If one considers the thickness to be a constant average thickness of 10 mm, then the surface area becomes directly proportional to the volume of material. With the density of a given material being constant for that material, the surface area becomes directly proportional to the mass (since mass=volume×density).

Since typical turbochargers weigh in the range of 2 to 35 kg the volume of material in the casting will cause a lag in the time for the system to change temperature during a transient in engine conditions. The volume of material in the turbocharger assembly pulls thermal energy from the exhaust gas, which results in lower temperature exhaust gas downstream of the turbocharger assembly.

The properties of various turbocharger materials are:

|  | k<br>Thermal<br>conduct<br>w/(mK) | C<br>Specific<br>Heat<br>J/KgK | ρ<br>Density<br>Kg/m³ |
| --- | --- | --- | --- |
| Cast Iron (Pearlitic) | 33.472 | 603 | 7100 |
| SS 309 | 15.66 | 502 | 9010 |
| Aluminum A356 | 128 | 900 | 2680 |
| Al A201 | 121 | 963 | 2790 |

US Application 2005/0019158 (Claus) teaches the benefit of sheet metal turbine housings, with double walled design, in order, from the vehicle perspective, to save weight but more importantly, to reduce the thermal inertia of the system by preventing excessive cooling of the exhaust gases of the engine in the case of a turbocharger operating off peak cycle. These sheet metal turbine housings are used generally to enable the catalyst to reach operating temperature quickly, not to assist in Diesel particulate filter (DPF) regeneration. Sheet metal turbine housings reduce the mass and hence the thermal inertia but the tooling is very expensive as a separate stamping or forming tool has to be manufactured for each element of the turbine housing. The assembly and welding of the individual elements to make a complete turbine housing is also labor intensive and costly.

EP Application 1,541,826 B1 (Bjornsson) teaches the manufacture of a welded, lightweight, jacketed, exhaust manifold. Further, it is taught to be advantageous that the "efficient mass", i.e. the mass that must be heated prior to catalyst light-off, is significantly reduced, since a smaller mass to be heated allows for a faster catalyst light-off. This patent does include the option of a wastegate but only in the sense that the pipe to the wastegate opening is jacketed and fabricated as part of the welded, jacketed manifold. The patent mentions that the wastegate o valve can be mounted in the wastegate at any occasion but preferably after all the welding is performed. The low thermal inertia feature of this design is favorable in reducing the catalyst light off period but the feature helping reduce the catalyst light off period still presents a reasonably high level of thermal inertia to the system for the process of DPF regeneration.

Thin walled turbine housing castings using the investment casting process are in use, and they do substantially reduce the mass and hence the thermal inertia, but at a significant increase in tooling and piece part cost. The cost of a welded sheet metal turbine housing in contrast is approximately 170% of the cost of a cast, ductile iron, housing and the weight savings is approximately 20%, so the thermal inertia will be approximately 80% that of a cast ductile iron turbine housing, but at a cost premium of 70%.

Over the past 20 years Diesel engine manufacturers have lowered $NO_x$ by 85% and particulate matter (PM) by 95%. For 2010 emissions, regulations mandate that emissions must be lowered a further 83%. The EPA intended for heavy-duty emissions, post 2007, to be "aftertreatment-forcing". For light duty, tier 2 bin 5, emissions requirements are forcing aftertreatment today. This will require some novel approaches in order to satisfy all of these goals.

The typical exhaust composition of a modern gasoline engine comprises:
unburned hydrocarbons—HC
carbon dioxide and carbon monoxide—$CO_2$ and CO
nitrogen and oxides of nitrogen grouped under the heading of $N_2$ and $NO_x$
unreacted oxygen—$O_2$ Since modern Diesel engines operate in a region very lean of stoichiometric, with an air/fuel ratio (A/F)>22, they produce carbon dioxide ($CO_2$), and carbon monoxide (CO), gaseous oxides of nitrogen grouped under the heading of $NO_x$, and hydrocarbons (HC).

The $NO_x$ segment of emissions is predominantly tackled by one of two methods: Exhaust Gas Recirculation (EGR) or Selective Catalytic Reduction (SCR). In either case the HC component is processed in a Diesel Particulate Filter (DPF).

For the reduction of THC, CO and TPM in Diesels, a Diesel Oxidation Catalyst (DOC) is commonly used. The DOC must be at a characteristic elevated temperature in order for it to work efficiently. The catalyst has to be at 210° C. before the catalyst functions above 25% efficiency, and it functions at 90% efficiency at 220° C. There have been test cycles for catalyst light off which demonstrate light off as low as 175° C. It is accepted that, to have a system which elevates the catalyst temperature to operating regimes, it must be capable of achieving between 175° C. and 210° C. in the first 60 to 120 seconds after cold start.

When the catalyst is at operating temperature, it converts some of the impurities in the exhaust gas, such as any unburned fuel, or combustion by-product, before the exhaust gas is emitted from the tailpipe into the atmosphere. The effectiveness of the catalyst, for the first few minutes of engine operation while still at ambient temperature, in a gasoline engine is almost non-existent. Between 60% and 80% of gaseous emissions are generated in these few minutes (some are as fast as 20 seconds) before the catalyst reaches its operating temperature of around 300° C. Gasoline engine catalysts operate at around 600° C. by the end of a trip. They generally will then cool back down to 300° C. within 30 minutes. Diesel catalysts are formulated for lower temperatures (200° C. to 300° C.). The majority of the generation of HC starts at about 20 seconds after engine start and continues at a growing high rate until 120 seconds after start.

The conversion of CO, by a catalyst, is temperature sensitive. FIG. 15 shows the conversion efficiency of a typical CO catalyst. The X-axis (143) depicts the temperature, in degrees centigrade, of the catalyst, at the catalyst. The Y-axis (144) depicts the conversion efficiency. It can be seen from the chart that the conversion efficiency (141) does not really begin until it kicks in (142) at a temperature of 220° C.

There are several existent solutions to this "time to cat-light-off" problem, one of which is using phase-change materials in the catalyst body to keep the catalyst substrate temperature close to the temperature required for the catalyst to function. Another is to close-couple the catalyst with the engine to minimize thermal inertia. Another development is to place a pre-catalyst prior to the turbine housing. There are many methods for dealing with this start-up non-thermally active catalyst problem. They are all complex, space invasive, and expensive.

U.S. Pat. No. 6,389,806 (Glugla) teaches that in order to shorten the time to reach operating temperatures an engine has variable displacement with retarded spark timing and air/fuel ratio biased to lean for the activated cylinder bank during and shortly afterward starting to further reduce the time required for catalyst light off.

U.S. Pat. No. 7,117,668 (Nashburn) teaches the use of a hydrocarbon reformer to supply the engine with fuel-lean reformate fuel mixture to ensure that all the fuel is burned while the exhaust converter is thermally non-functional.

U.S. Pat. No. 5,878,567 (Adamczyk) teaches a catalytic converter having a first highly loaded palladium or trimetal catalytic element containing palladium of relatively large particle size closely coupled to the engine exhaust manifold followed by one or more second catalytic elements having high oxygen storage capacity to provide protection against warmed up engine emissions break through is efficient in reducing cold start emissions through early catalyst light-off.

U.S. Pat. No. 5,410,872 (Adamczyk) uses an exhaust gas oxygen sensor to determine the amount of oxygen contained in the exhaust entering the catalyst, and an engine control computer connected with the air source and the oxygen sensor monitors the amount of oxygen contained in the exhaust and controls the amount of air supplied to the exhaust stream by the air source such that the available oxygen is slightly in excess of the stoichiometric requirement. In this manner, the light-off time of the catalyst is minimized.

There are devices which supply heat to the aftertreatment for the purposes of PM regeneration them or cleaning them. These devices are not intended to aid in faster catalyst light off, and are an added expense to the vehicle cost for PM regeneration. They deal with temperatures in the range of 700° C. to 800° C.

U.S. Pat. No. 3,908,371 (Tadashi) teaches a method of and a system for cleaning exhaust gases. The engine supplies exhaust gas proportioned to provide an excess-air ratio of about 1.0 to 1.15 so that substantially no carbon monoxide and hydrogen are present in the exhaust gases emitted from the engine. A reducing agent, such as hydrocarbons, is admixed to the exhaust gases entering the reducing catalyst for removing an excess of oxides and reducing the nitrogen oxides in the exhaust gases while secondary air is supplied to the exhaust gases entering the oxidizing catalyst for assisting in the oxidization of the carbon monoxide and hydrocarbons remaining in the exhaust gases passed through the oxidizing catalyst. This then cleans the catalyst at high temperature.

Diesel combustion also produces solids and liquids. These solids and liquids are usually grouped and referred to as particulate matter (PM). The PM component of diesel emissions comprises:

1. soluble organic fractions (SOF) from the lubricant
2. dry carbon (which is known as soot)
3. SOF from the fuel
4. $SO_3$ and $H_2O$ According to the U.S. Environmental Protection Agency, 40 CFR Parts 9 and 86 "Test Procedures for Heavy-Duty Engines, and Light-Duty Vehicles and Trucks and Emission Standard Provisions for Gaseous Fueled Vehicles and Engines" PM is measured as part of the Federal Trade Procedure (FTP), in which an engine operates through a range of pre-determined cycles representing different driving cycles and gathers the PM for the entire cycle thus trapping the PM developed during engine transients. The PM portion of these emissions is often dealt with using Diesel particulate traps (DPF).

Most post-2007 US heavy duty Diesel engines come equipped with diesel particulate filters (DPFs). Catalyst-based DPFs, when used with ultra-low sulfur fuels, can achieve PM reductions in the region of 90%.

The DPF is a porous ceramic material housed in a metal housing located in the exhaust stream. The filter media in many of the commercially available DPFs is either a Cordierite or Silicon Carbide material. Typically the matrix has hundreds of channels; the opposite ends of adjacent channels are blocked thus forcing the exhaust stream through the tube sidewalls which captures the PM. The solid factions in the PM build up in the walls of the channels, causing blockage of the filter. The building up of the solid faction in the DPF is often referred to as "loading". This solid faction has to be burned off to return the DPF to its properly functioning mode, and the process of burning the solid faction off is known as regeneration. The soot which burns off is converted to $CO_2$ and CO, which then passes through the filter.

The soot from Diesel combustion also consists of non-combustible elements which deposit ash in the DPF. The cleaning of this ash from the DPF is called "cleaning" and must be done out of the vehicle. The frequency for cleaning is every 200,000 to 400,000 miles.

The engine exhaust temperature and duty cycle dictates whether the DPF action is passive or active. Passive regeneration requires that the continuous exhaust temperature is in the range of 325° C. to 420° C., which is sufficient to spontaneously combust the soot as it accumulates. When the DPF is operating in the passive mode the exothermic reaction emanating from the reaction between the PM, which is trapped in the channel walls and the oxidizing agents ($O_2$ and $NO_2$) will maintain the appropriate pressure differential in the DPF. In this case the DPF internal temperature is usually below 700° C.

Active regeneration requires the input of a person or system to initiate and accomplish regeneration. Active regeneration is required when the steady state exhaust temperature does not achieve sufficient temperature; the engine duty cycle does not allow enough high temperature to burn off the soot, or since the regeneration period is in the range of 20 to 30 minutes, the time for regeneration is too short. In this case the PM builds up, or loads in the channel walls, the pressure differential across the DPF goes up, which then usually triggers a command for the vehicle emissions system to go into the active regeneration mode.

In typical on-highway long haul trucks the DPF regeneration is mostly passive as the engine duty cycle is sufficient to develop enough exhaust gas temperature to continuously burn off the soot component of the PM.

In urban Diesel vehicle use, often the engine duty cycle is dictated by frequent starting and stopping, so both the temperature and time requirements for active regeneration are not met. In typical active regeneration systems the exhaust system is "dosed" with fuel for a period of time to elevate the temperature in the DPF for the regeneration period. This regeneration period is fraught with problems. For instance if the vehicle speed drops below a set speed, for example 20 mph, then the regeneration must stop. If the compression brake is activated, during regeneration, the additional fuel dosing must cease so the regeneration period is interrupted. Since the regeneration process develops temperatures in excess of 800° C., within the matrix, and consumes about a gallon of fuel, the process must be executed in a safe manner. These high temperatures can also be harmful to the substrate, which can warp and be damaged or even, in extreme cases, melt. If the substrate is coated, as is often the case, these extreme temperatures can damage the catalyst or the affixing of the catalysts to the substrate. If the regeneration temperature is not sufficiently high to support soot burn-off then the regeneration period is extended to durations in the 20 to 30 minute range.

The exhaust system of a modern Diesel engine usually has several after treatment devices in the system. In addition to the DPF, there can be Diesel Oxidation Catalysts (DOC); Ammonia Producers for SCR systems; SCR catalysts; and additional catalysts in the ammonia production system, all of which add thermal inertia to the system.

FIG. 2 depicts the layout of a typical single turbocharger installation in which fresh air is drawn in through an air cleaner (25), and then through an inlet duct (24) which fluidly couples the air cleaner (25) to the inlet of the compressor stage (2) of the turbocharger. The compressor stage (2) is driven by the turbine stage (1). Exhaust gas from the engine (100) passes from the combustion chamber of the engine to the exhaust manifold (7) to the turbine stage (1) and then passes to the after treatment devices through an exhaust pipe (11). The after treatment consists of a DPF (12) and a catalyst (13) but can also include the devices required to generate ammonia for an SCR system or for other after treatment devices. For an EGR system, the exhaust gas in the exhaust manifold is fed to the EGR cooler (15) and thence to the inlet manifold (22) where it mixes with the compressed air from the compressor stage of the turbocharger, after the compressed air is cooled in the intercooler (20). The mix of cooled, compressed air from the intercooler (20) and cooled EGR gas from the EGR cooler (15) is controlled by the inlet valve (21).

For DPF regeneration, either the combustion is dosed with excess fuel to generate a higher temperature exhaust flow, or in some cases an additional injector is provided just upstream of the DPF to "dose" the incoming exhaust flow to regenerate the DPF. In the case of upping the combustion temperature the fuel "dosing" elevates the typical engine-out temperature in the exhaust manifold to greater than 600° C. so that the temperature of the exhaust gas just upstream of the DPF exceeds 550° C. for at least 10 minutes for the regeneration period. The thermal inertia of all of the elements of the exhaust system, the turbocharger, the down pipe, and the exhaust pipe all work against the DPF seeing this elevated temperature efficiently and quickly, resulting in longer regeneration periods.

FIG. 6 shows an engine equipped with a regulated two stage (R2S) turbocharger system in which the exhaust gas flow can be modulated to flow through either or both, or a combination of both, turbine stages. The result of this layout, which is often used to generate high pressure ratios (in the compressor stage) required of EGR systems, is a more than double increase in thermal inertia since there are now two turbine stages and the ducting to facilitate that configuration. This means that the heat sink pulling thermal energy from the exhaust flow required for DPF regeneration is much greater and the regeneration period will be longer requiring more fuel for this regeneration process.

There are devices which supply heat to the aftertreatment for the purposes of PM regeneration. They deal with temperatures in the range of 700° C. to 800° C. U.S. Pat. No. 3,908,371 (Tadashi) teaches a method of and a system for cleaning exhaust gases. The engine supplies exhaust gas proportioned to provide an excess-air ratio of about 1.0 to 1.15 so that substantially no carbon monoxide and hydrogen are present in the exhaust gases emitted from the engine. A reducing agent, such as hydrocarbons, is admixed to the exhaust gases entering the reducing catalyst for removing an excess of oxides and reducing the nitrogen oxides in the exhaust gases while secondary air is supplied to the exhaust gases entering the oxidizing catalyst for assisting in the oxidization of the carbon monoxide and hydrocarbons remaining in the exhaust gases passed through the oxidizing catalyst. This then cleans the catalyst at high temperature.

It is imperative that the regeneration occur when commanded by the condition of the DPF so that the vehicle continues to meet emissions regulations. In most cases these conditions require that the process is performed in as short a time, at a temperature safe to the vehicle and DPF environment, as possible.

Thus there is a need for a simple, low cost solution, which lowers the thermal inertia of the exhaust system at either, and preferably both, the period of DPF regeneration and at the engine at start up.

SUMMARY OF THE INVENTION

The process of active DPF regeneration requires that the DPF be brought to regeneration temperatures in excess of 550° C. to 600° C. for a period of time sufficient to accomplish soot burnoff in the DPF. The thermal inertia of the single turbocharger, and more critically that of the multiple turbochargers, particularly but not limited to engine startup, delays the exhaust gas to the DPF from reaching critical temperature quickly. In accordance with the present invention, the incorporation of a low thermal inertia, insulated, turbocharger bypass duct reduces the time for the DPF to reach critical temperature for active DPF regeneration.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Thermodynamically, a turbine housing functions like a massive heat sink. A cast iron turbine housing, when cooler than the exhaust temperature, will strip thermal energy from exhaust gas. Since the thermal inertia of one turbocharger is significant, it must be accepted that the thermal inertia of multiple turbochargers is proportionately significantly increased. Similarly, since VTG turbochargers contain many parts and have higher mass, the thermal inertia properties are proportionately significantly increased. In the case of multiple stage turbochargers the thermal inertia increases by the multiple of turbocharger count, plus the volume, and nature of the material connecting the multiple turbochargers.

In order to minimize the time required for regeneration of the DPF it is critical that the maximum use is made of thermal energy from the engine, found in the exhaust gas stream. To facilitate the desire for maximum thermal energy reaching the DPF at the time desired for regeneration, a well insulated (to minimize radiation from the bypass to the outside air), bypass having low thermal inertia is provided.

Since thermal inertia is driven by surface area, thickness, density, specific heat, and thermal conductivity of the materials in question, a table of the relative masses of the components in the invention is provided below to provide some comparison.

| Description of turbine housing | Mass of turbine housing (Kg) | Mass of cast iron bypass pipe (Kg) | Mass of Stainless Steel 309 thin-walled bypass pipe (Kg) |
|---|---|---|---|
| 96 mm fixed | 27.22 | 2.17 | .007 |
| 87 mm VTG | 35.4 | 2.17 | .034 |
| 70 mm fixed | 14.81 | 2.17 | .034 |
| 70 mm VTG | 26.1 | 2.17 | .034 |
| 70 mm R2S | 29.9 | 2.17 | .034 |
| 52 mm fixed | 5.44 | .277 | .007 |
| Pass car fixed | 2.6 | .277 | .007 |
| Pass car R2S | 7.5 | 2.17 | .034 |

A turbine housing has an inner surface area of approximately 0.15 m². A bypass pipe in cast iron, of 25 mm ID and 457 mm length, has an inner surface area of 0.036 m², which is 0.036/0.15=24% of the surface area of the turbine housing.

The coefficient of thermal conductivity "□" of cast iron is 33.5 W/m-° K. The "□" of stainless steel 309 is 15.7, therefore the ratio of the thermal conductivity of a thin-walled SS 309 bypass pipe (e.g., 0.6 mm-0.25mm), over that of a similarly dimensioned (25 mm ID 457 mm length) cast iron pipe will be a factor of 15.7/33.5=0.468. So it can be seen that a thin-walled stainless steel bypass pipe will have a thermal inertia of 0.094×0.24×0.468=0.0106, or 1% that of the turbine housing, which it bypasses.

Figure 16:
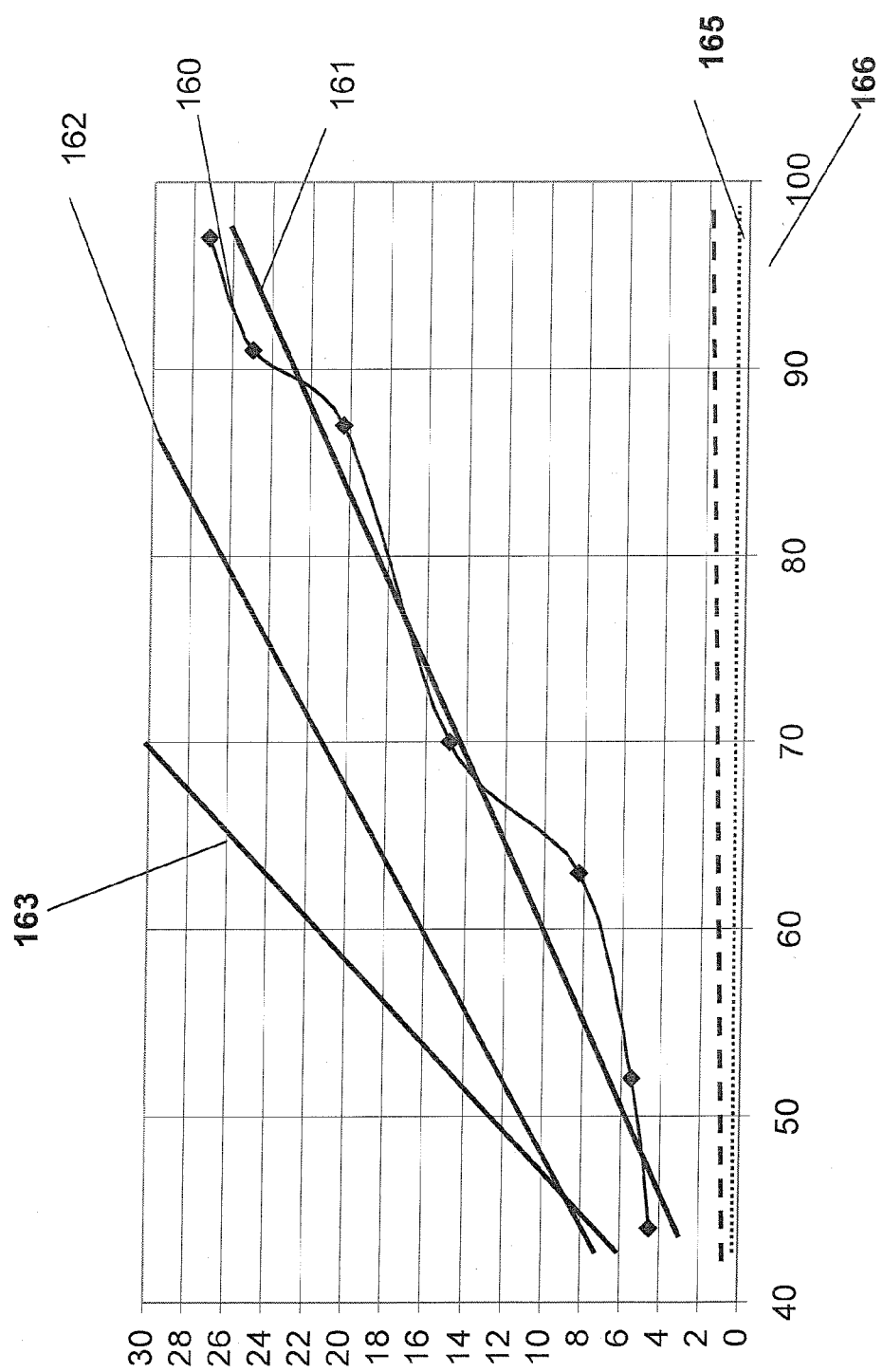
FIG. 16 is a chart depicting the relative masses of components in a turbocharger system.

FIG. 16 depicts the ratio of masses (or surface area for a constant average wall thickness, in the same material) for a range of turbine housings, rated by the turbine wheel size in mm noted on the "X"-axis, and the mass in Kg on the "Y"-axis. The trendline (160) smoothes out the range (160) of masses of turbine housings noted by the inventors. The line above that (162), represents the masses of a range of VTGs in production, and the line above that (163) represents the masses of some production R2S turbocharger systems. At the lower end of the chart are two lines representing the masses of turbocharger bypasses. The larger dashed line represents the masses of cast iron bypass pipes. The bypass changes in diameter as the turbochargers become larger. The thinner dashed line (166) below that represents masses of the low thermal inertia stainless steel bypass tubes. The internal diameters of these tubes also changes as the turbos become larger.

From the chart in FIG. 16 it can be seen that for small turbochargers the ratio of the mass of the cast iron bypass to the mass of the largest turbine housing configuration is in the range of from 6% to 30%. For the larger turbochargers (near 91 mm) the ratios range from 2.5% to 15%. For all turbochargers, the ratio of the mass of the SS thin-walled bypass to that of the turbine housing ranges from 0.11% to 0.45%. The ratio of the mass of the SS bypass to that of the cast iron bypass ranges from 1.57% to 2.53%. So it can be seen that the thermal inertia for an insulated, thin-walled bypass is a huge reduction when compared to that of the turbine housing.

A typical turbine housing for a 91 mm turbine wheel has a mass of 25 Kg, a turbine housing for a 70 mm turbine wheel has a mass of 15 Kg. A similarly sized VTG turbine housing has a mass of 26 Kg. A two stage for a similar engine to that of the above turbocharger with a 70 mm wheel has a mass of 30 Kg. For the same turbocharger examples, a cast iron bypass will have a mass of from 0.27 kg to 2.17 kg, and the mass of a stainless steel thin-walled bypass pipe will range from 0.007 kg to 0.034 kg.

If the wall thickness "Y" of the bypass pipe is reduced from the cast iron thickness of 6.4 mm to the stainless steel thickness 0.6 mm then the thermal conductivity path will be reduced by 0.6/6.4=0.094 of the original therefore this change would produce a thermal inertia change of the same factor.

Figure 1:
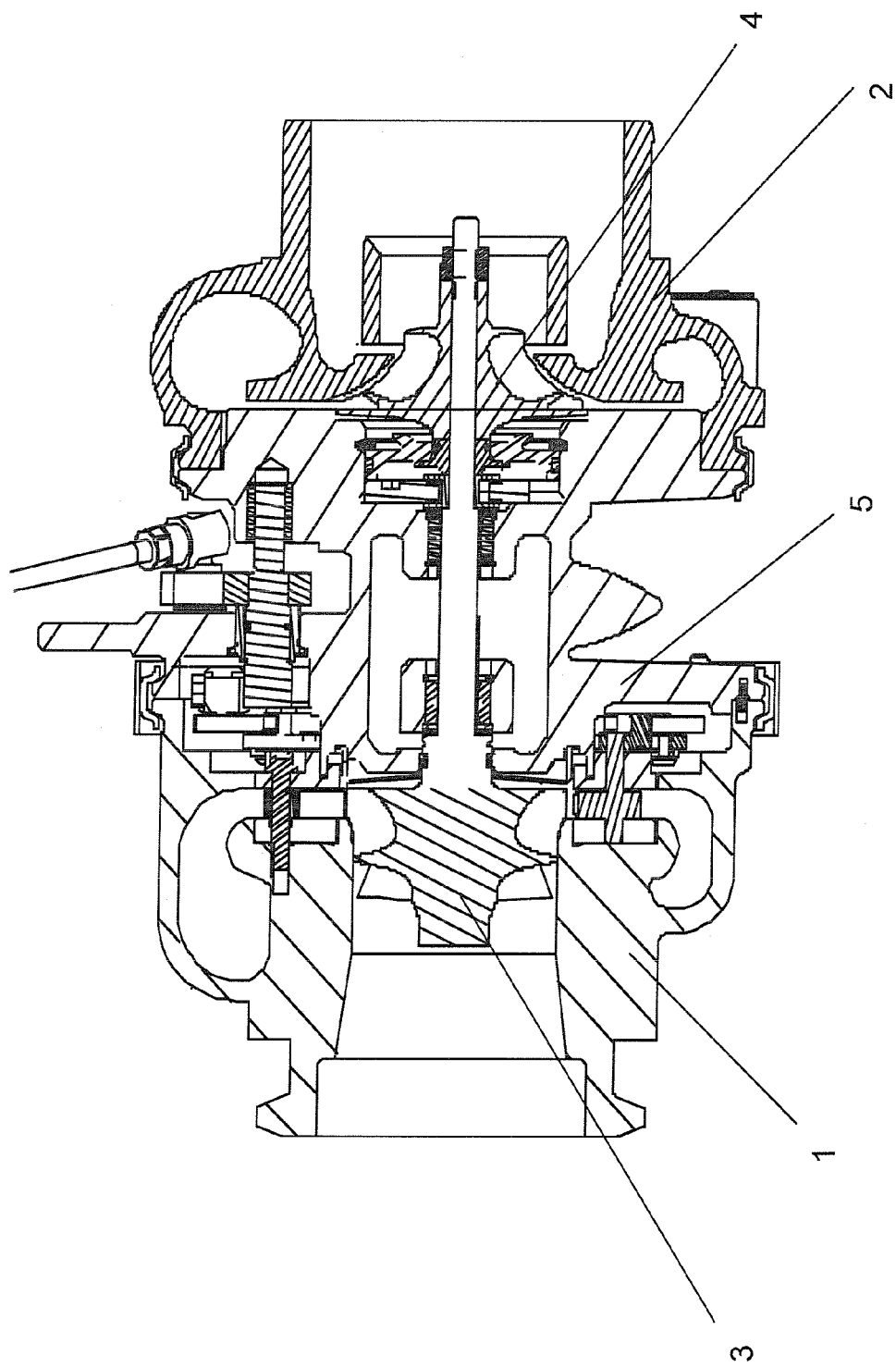
FIG. 1 depicts a section of a typical turbocharger.
Figure 2:
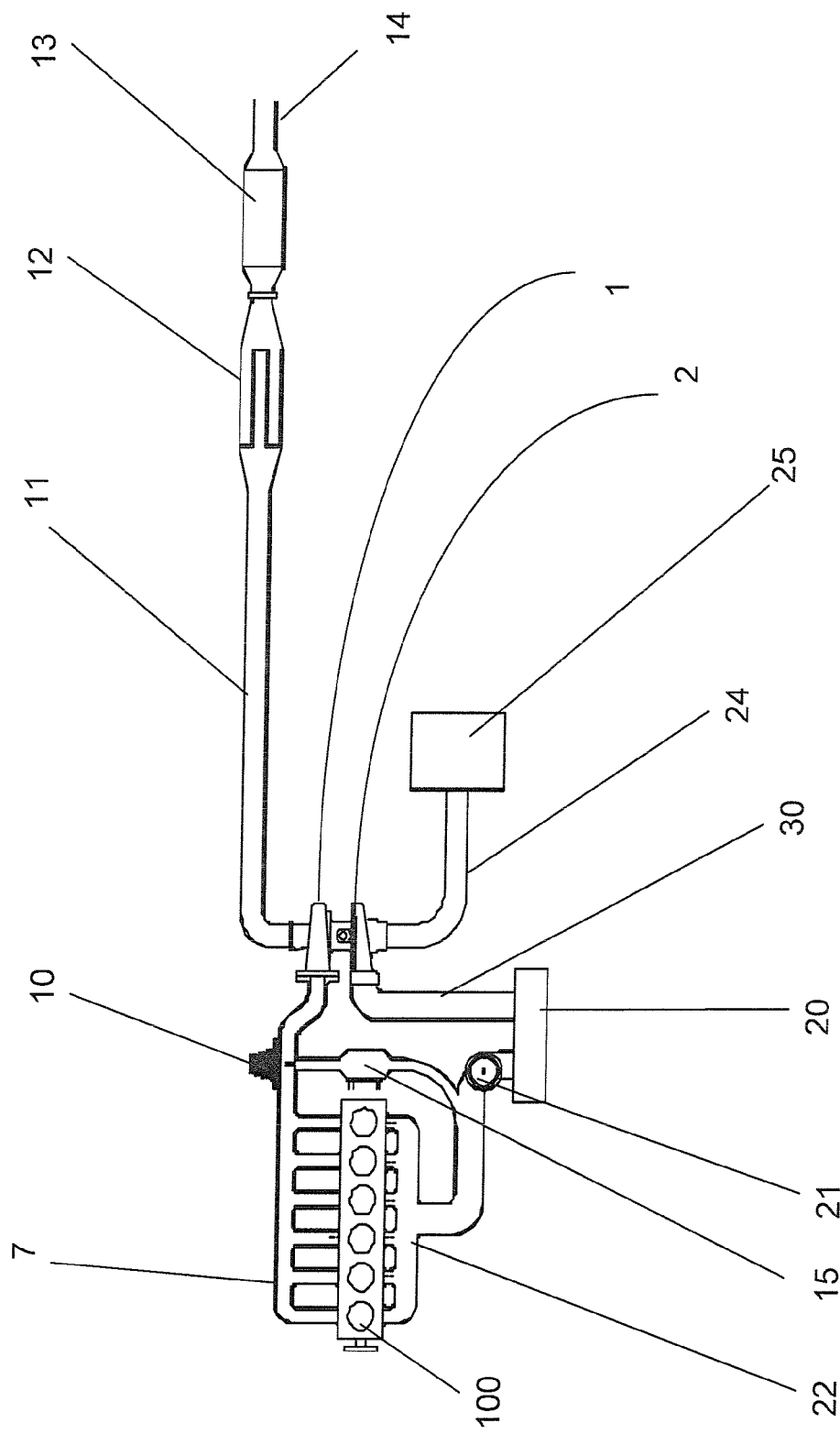
FIG. 2 is a schematic depicting a typical single turbocharger engine with after treatment.
Figure 3:
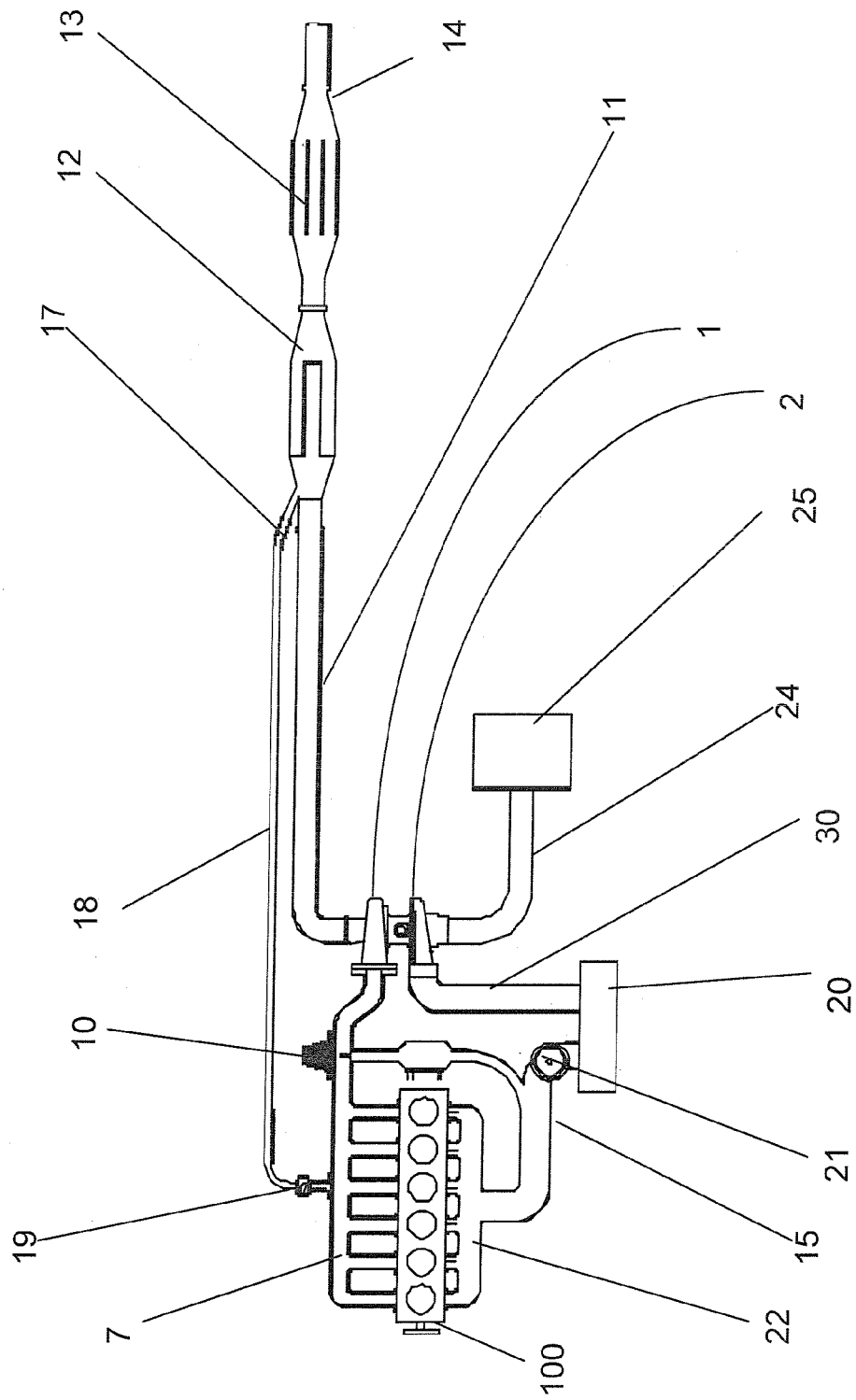
FIG. 3 is a schematic depicting a typical single turbocharger engine with after treatment using a long, low thermal inertia bypass with the after-treatment in a typical vehicle installation position.

In FIG. 3 exhaust gas from the exhaust manifold (7) is ducted through a control valve (19) through a low thermal inertia, well insulated bypass duct (18) to a delivery point just upstream of the DPF (12). In one implementation, the bypass piping or duct (18) can introduce exhaust flow into the exhaust stream within 5 cm of the housing inlet of the aftertreatment device (e.g. the DPF (12)). The heated exhaust gas then is delivered to the ceramic DPF matrix (121) shown in greater detail in FIGS. 9 through 13. Using this novel system, the heated exhaust gas temperature is only minimally diluted by the bulk of the exhaust flow which is cooled by contact with the high thermal inertia, high mass, turbocharger and exhaust system.

The turbine stage (1) can include a housing having an associated inner surface area and weight. The bypass piping (18) can include an associated inner surface area, length and metal weight. In one embodiment, the inner surface area of the bypass piping (18) can be 1-25% of the inner surface area of the turbine housing. Further, the inner surface area of the bypass piping (18) can be 5-25% of the inner surface area of the turbine housing.

In one implementation, the length of the bypass piping (18) can be 200 cm or less. More particularly, the length of the bypass piping (18) can be 100 cm or less. Still more particularly, the length of the bypass piping (18) can be 50 cm or less.

In one embodiment, the metal weight of the bypass piping (18) can be 0.1 to 3% of the weight of the turbine housing. More particularly, the metal weight of the bypass piping (18) can be 0.1 to 1.5% of the weight of the turbine housing. Still more particularly, the metal weight of the bypass piping (18) can be 0.1 to 0.5% of the weight of the turbine housing.

Figure 4:
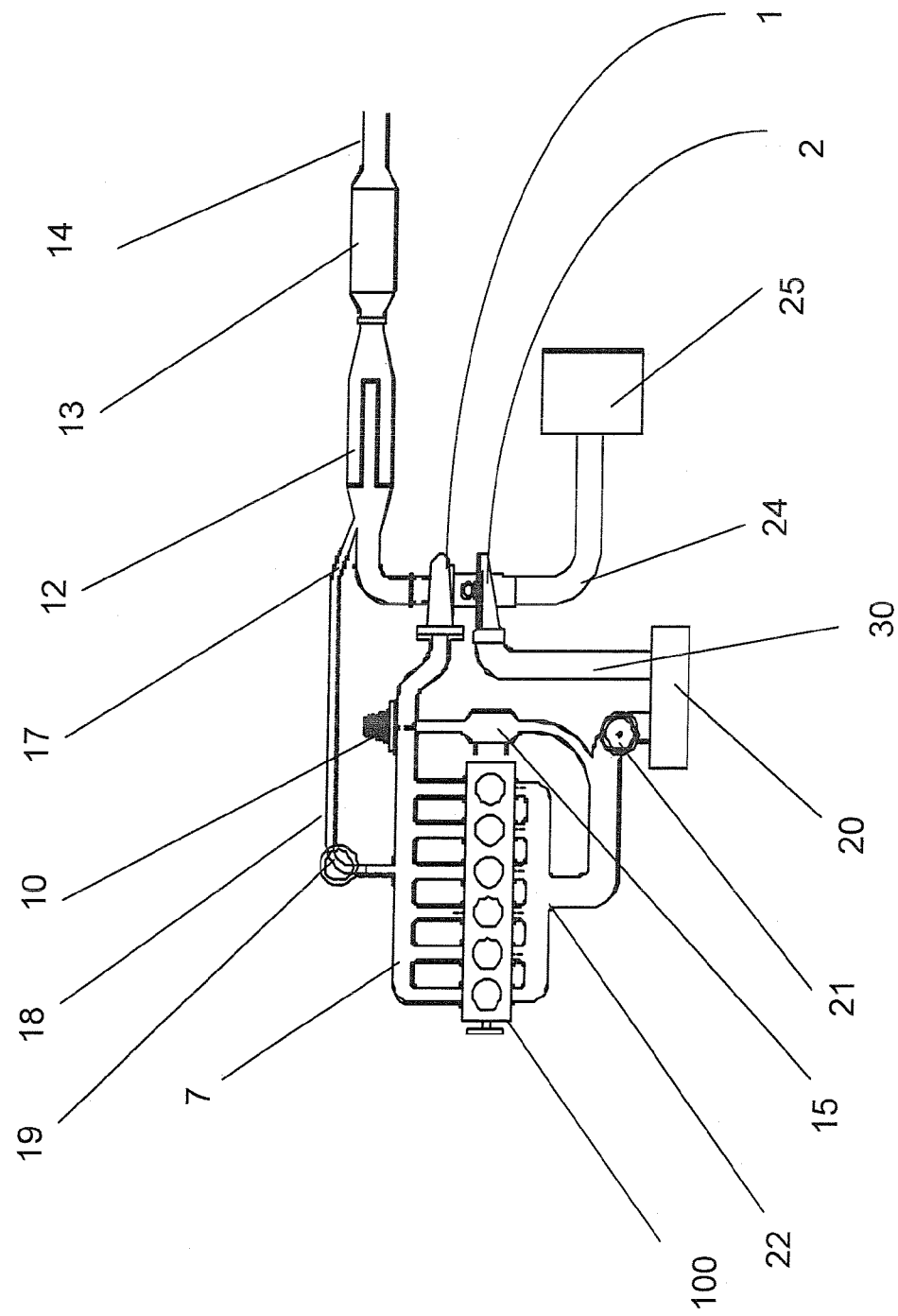
FIG. 4 is a schematic depicting a typical single turbocharger engine with the after treatment, in a close coupled position.

A more extreme embodiment of this configuration is shown in FIG. 4. The location of the DPF and possibly the other aftertreatment device(s) is modified to bring the DPF closer to the exhaust manifold. While this may look easy on paper, in real life, since the DPF runs at temperatures which can exceed 800° C., the packaging of such a layout, in a vehicle, is very difficult. Examples of other aftertreatment device(s) can include a Diesel Oxidation Catalyst, a particle filter regeneration device, a windshield defroster, and/or a catalytic converter.

Figure 5:
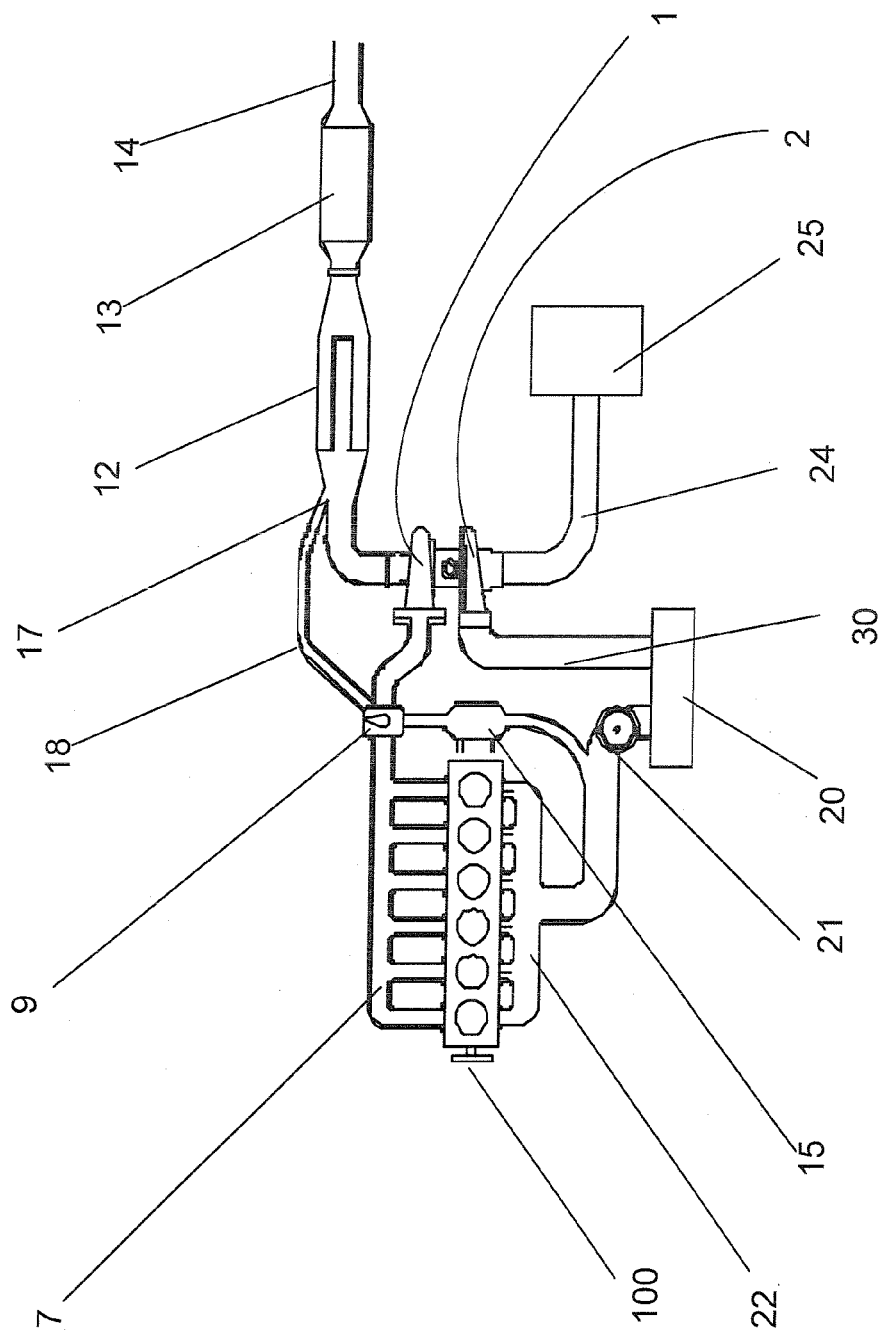
FIG. 5 is a schematic depicting a typical single turbocharger engine with the after treatment, in a close coupled position, and a dual purpose EGR/DPF flow valve.
Figure 6:
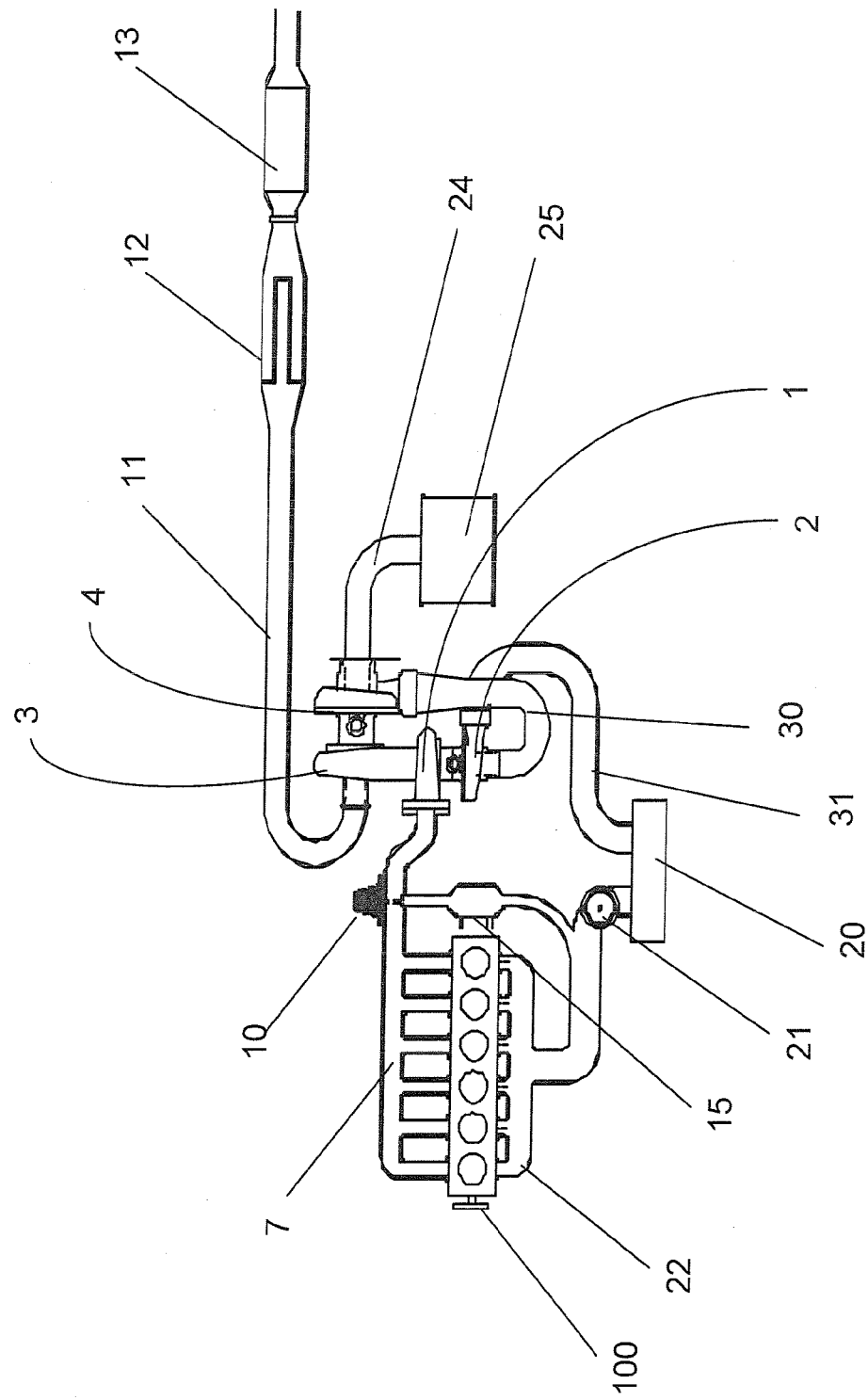
FIG. 6 is a schematic depicting a typical regulated two stage turbocharger engine with the after treatment, in typical vehicle installation position.

Another embodiment of this configuration is seen in FIG. 5 in which the EGR valve and the DPF regeneration valve are configured as a combined valve (9) such that the combined (EGR and low thermal inertia bypass duct) valve (9) can both control the flow of gas, through the low thermal inertia, heat insulated bypass duct (19) to the DPF (12) during regeneration periods thus saving the cost of a unique DPF regeneration flow valve.

Figure 7:
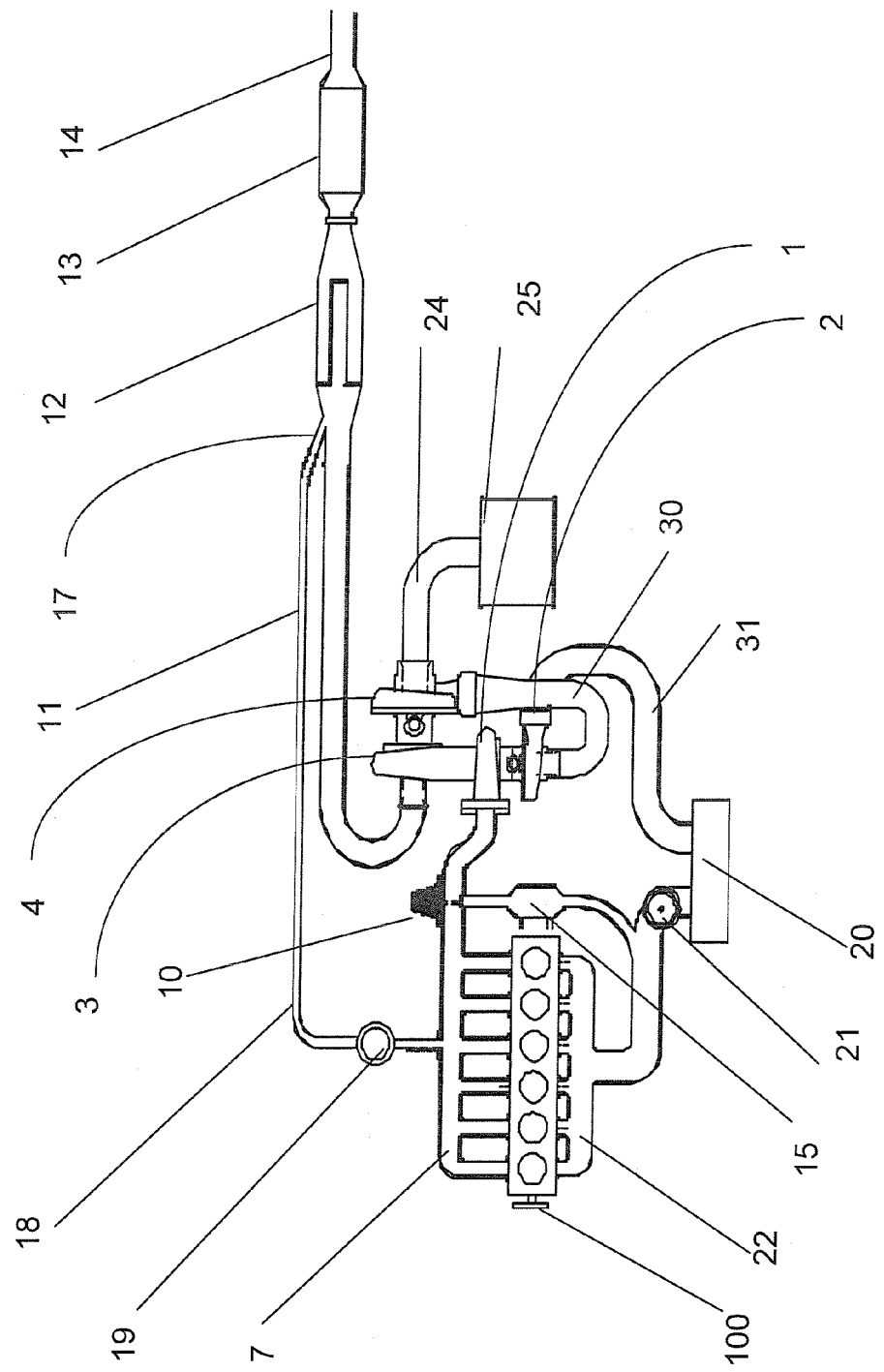
FIG. 7 is a schematic depicting a typical regulated two stage turbocharger engine using a long, low thermal inertia bypass with the after-treatment in a typical vehicle installation position.

In FIG. 7 a regulated two stage turbocharger system is used. This typically, in a commercial Diesel application, has a cast iron mass of approximately 34 Kg. For a passenger car application this will be less but it will still be about the same on the basis of percentage mass of the system, so it will comprise a large percentage of the thermal inertia of the entire system. In accordance with the invention, exhaust gas from the exhaust manifold (7) is ducted through a control valve (19) through a low thermal inertia, well insulated bypass duct (18) to a delivery point, just upstream of the DPF (12).

Figure 8:
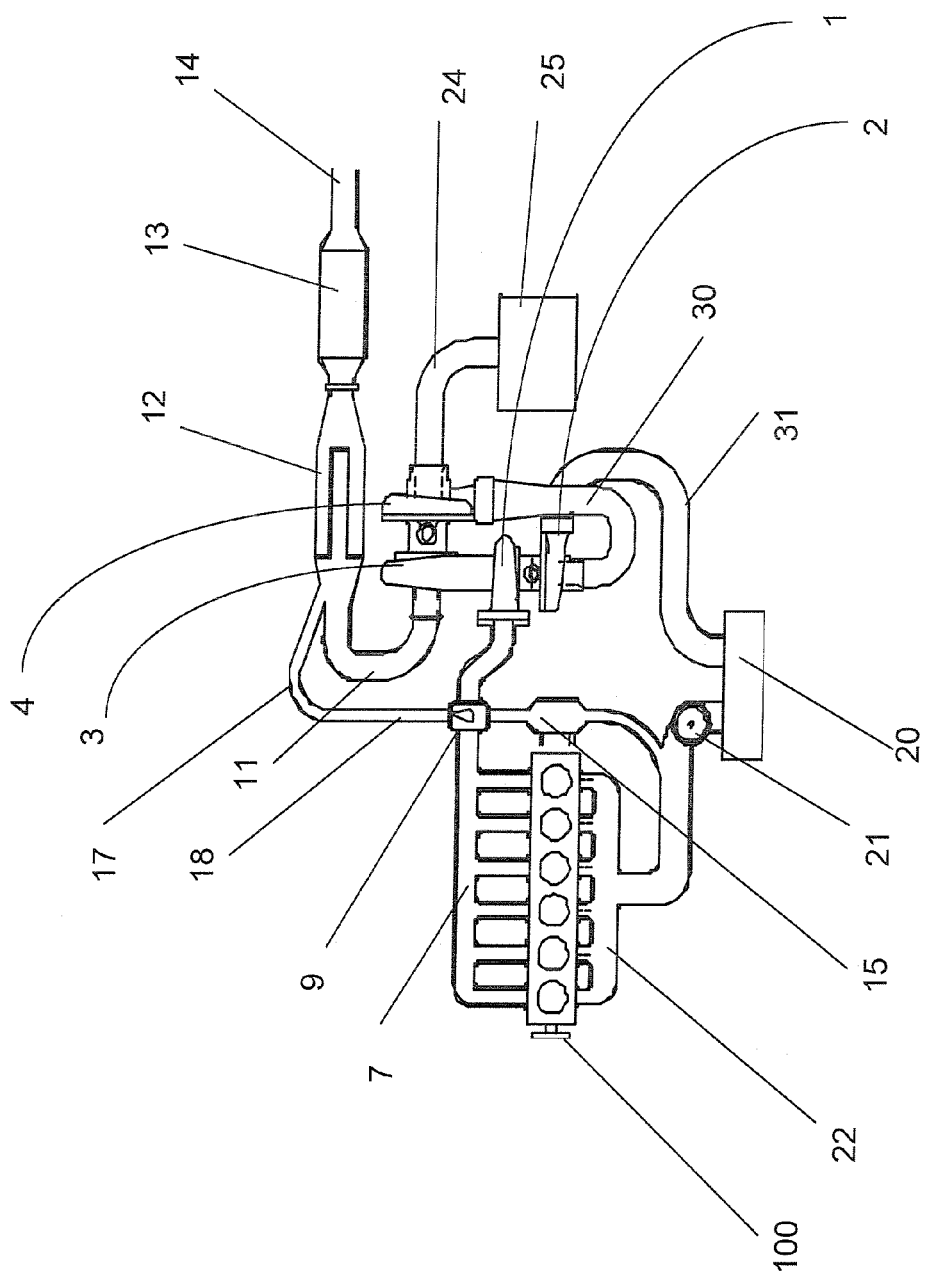
FIG. 8 is a schematic depicting a typical regulated two stage turbocharger engine using close coupled, low thermal inertia bypass with the after-treatment in a close coupled position.

Another embodiment of the regulated two stage design is shown in FIG. 8. As was explained above, the DPF (12) is located in the closest position possible to the exhaust manifold (7) to minimize the thermal inertia of the bypass. This embodiment, may, or may not have a dual purpose EGR/DPF regeneration valve (9) in place of a discrete EGR valve plus a discrete DPF regeneration valve.

Figure 9:
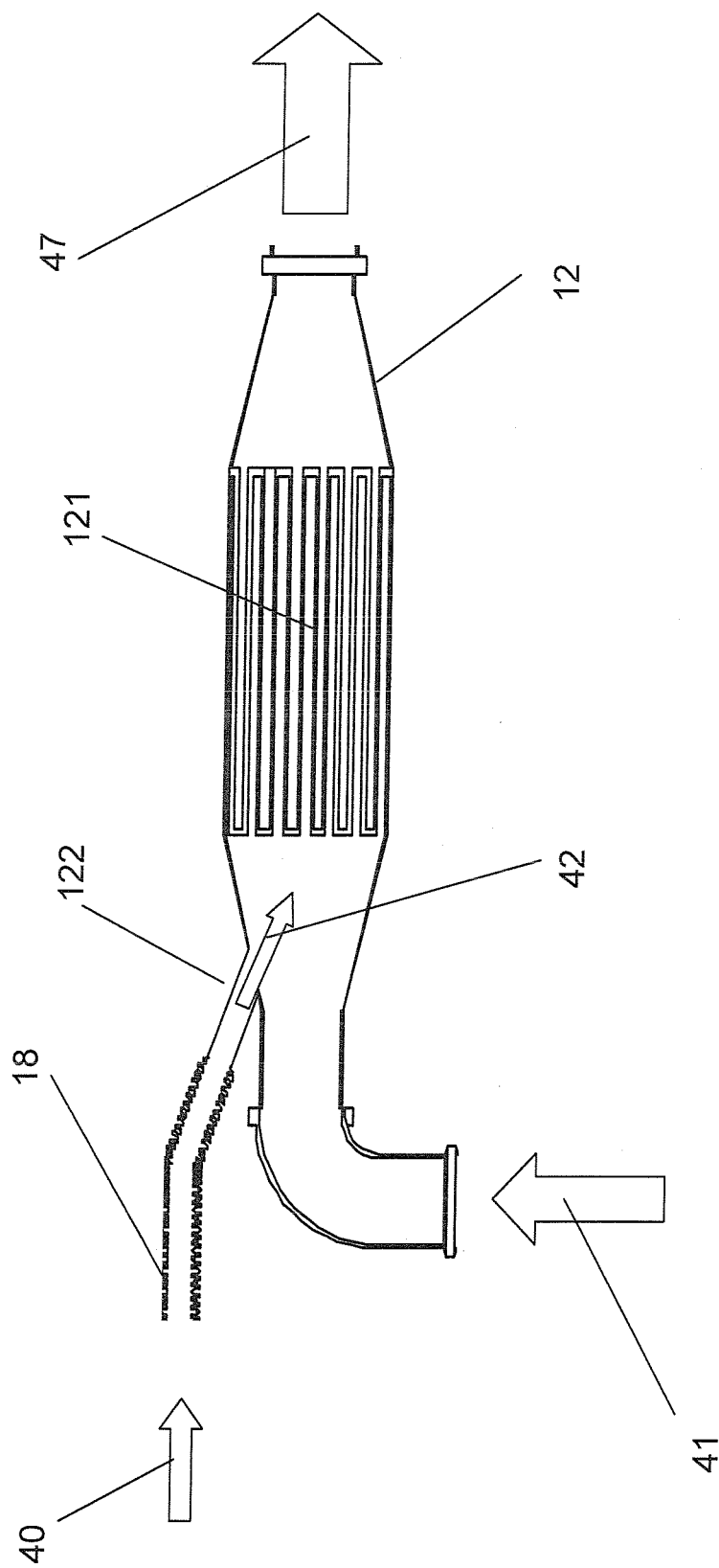
FIG. 9 is a schematic depicting a typical DPF with the low thermal inertia bypass tube entering the DPF at an angle.

When the low thermal inertia well insulated turbocharger bypass duct (18) is used the maximum benefit can be achieved by directing the non-heat diluted exhaust gas directly at the DPF ceramic matrix. FIG. 9 depicts a method in which the 'hot' exhaust gas (40) flowing in the low thermal inertia, well insulated duct (18) emerges from the duct (18) at location (122) in the direction (42) such that it impinges on the center of the ceramic matrix. In this manner the dilution with the "cooler" exhaust gas (41) which has traveled down the standard exhaust pipe, is limited.

In another embodiment, to minimize thermal inertia, so that the maximum of heat energy is delivered to the aftertreatment device, a thin, flexible duct which may be made of a superalloy, or stainless steel, is used to convey the bypassed gas. The superalloy, preferably an iron based superalloy, contains one or more of Ti, Nb, B, Hf and Zr, and suitable examples include SUH660, Inconel 713C, and Incoloy 800H. A typical stainless steel for such a pipe is SS309. By connecting the exhaust manifold to the vehicle down-pipe (34) with a low thermal inertia duct, less of the exhaust heat is absorbed by the duct than would be the case if the duct was a heavy walled casting, thus more of the exhaust energy is available to heat the catalyst or DPF.

Figure 10:
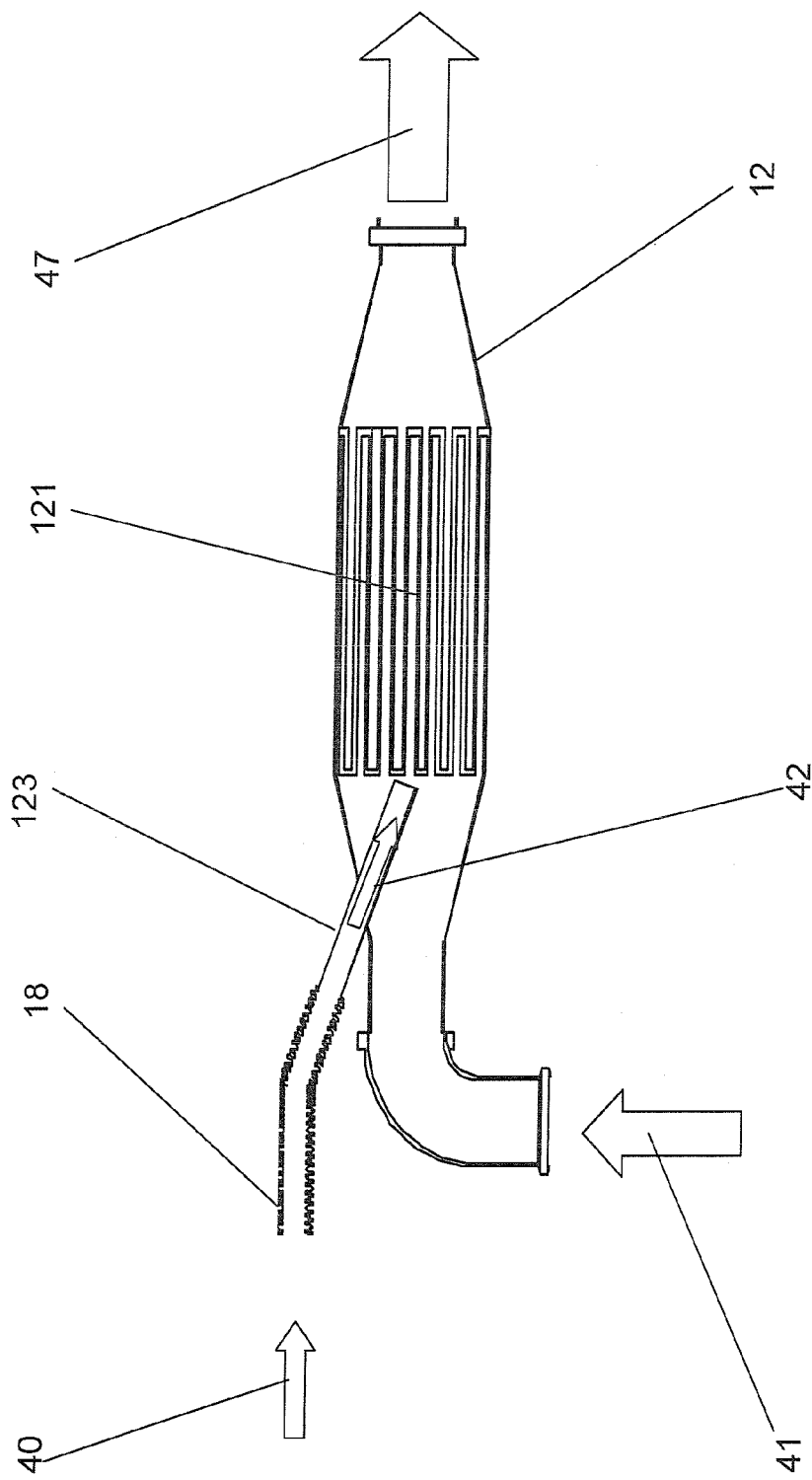
FIG. 10 is a schematic depicting a typical DPF with the low thermal inertia bypass tube shooting the bypass gas directly at the DPF matrix.

In a preferred embodiment the low thermal inertia, well insulated, turbocharger bypass duct (18) is used to direct the non-heat diluted exhaust gas directly at the DPF ceramic matrix. FIG. 10 depicts a method in which the 'hot' exhaust gas (40) flowing in the low thermal inertia, well insulated duct (18) emerges from the duct (18) at a location (123) in a direction (42) such that the exhaust gas impinges more directly on the center of the face of the ceramic DPF matrix than would be possible in the embodiment in FIG. 9. This embodiment may require some geometry changes to the ceramic matrix to achieve an even higher level of heating.

Figure 11:
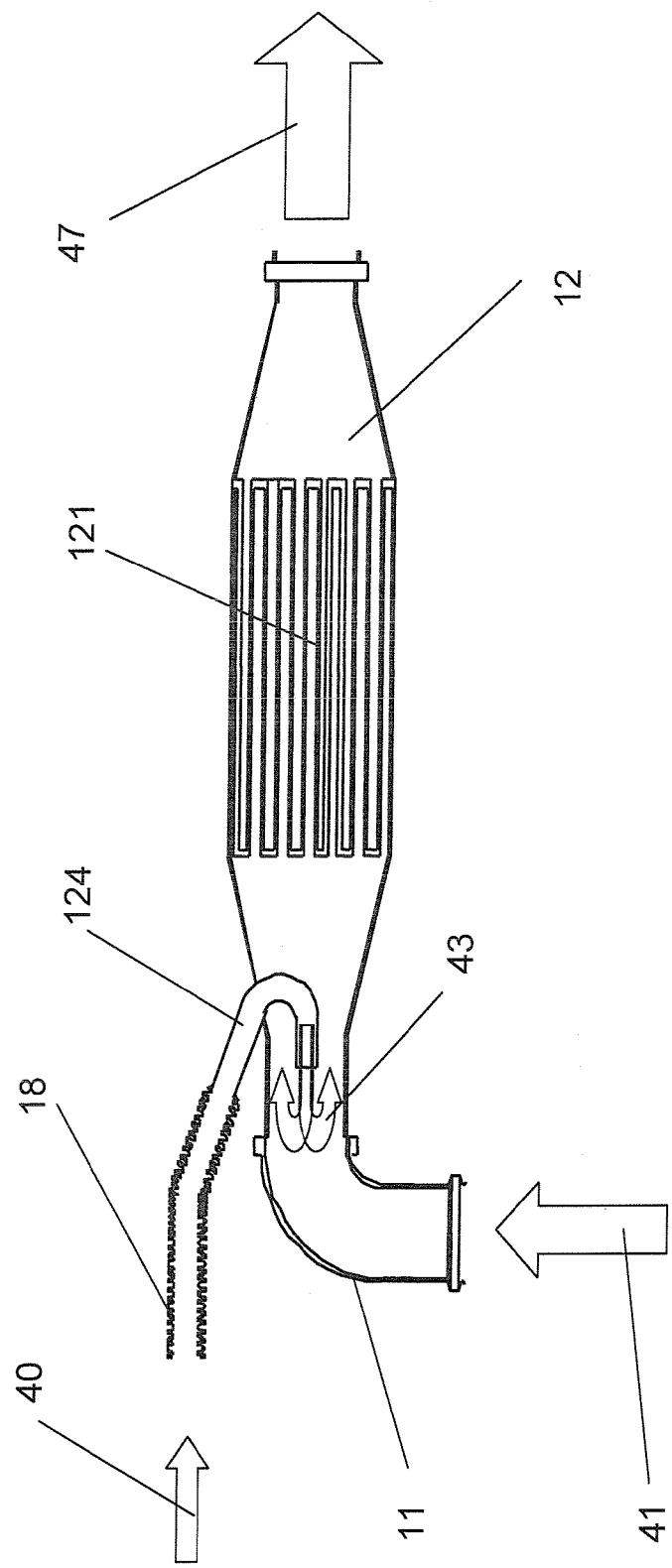
FIG. 11 is a schematic depicting a typical DPF with the low thermal inertia bypass tube shooting the bypass gas directly upstream, away from the DPF matrix.

In another embodiment of the design the low thermal inertia, well insulated, turbocharger bypass duct (18) is used to direct the non-heat diluted exhaust gas directly upstream away from the DPF ceramic matrix. FIG. 11 depicts a method in which the 'hot' exhaust gas (40) flowing in the low thermal inertia, well insulated duct (18) emerges from the duct (18) at a location (124) in a direction (43) opposite to the general flow of the incoming "cooler" exhaust flow (41) such that the design provides for excellent local mixing of exhaust gas temperature to carry the "partially heated" gas flow more uniformly across he face of the ceramic DPF matrix that would be possible with the embodiment in FIG. 9 or FIG. 10. This embodiment may require that some additional velocity be added to the incoming flow (40) from the bypass duct (18) in order to achieve optimum mixing.

Figure 12:
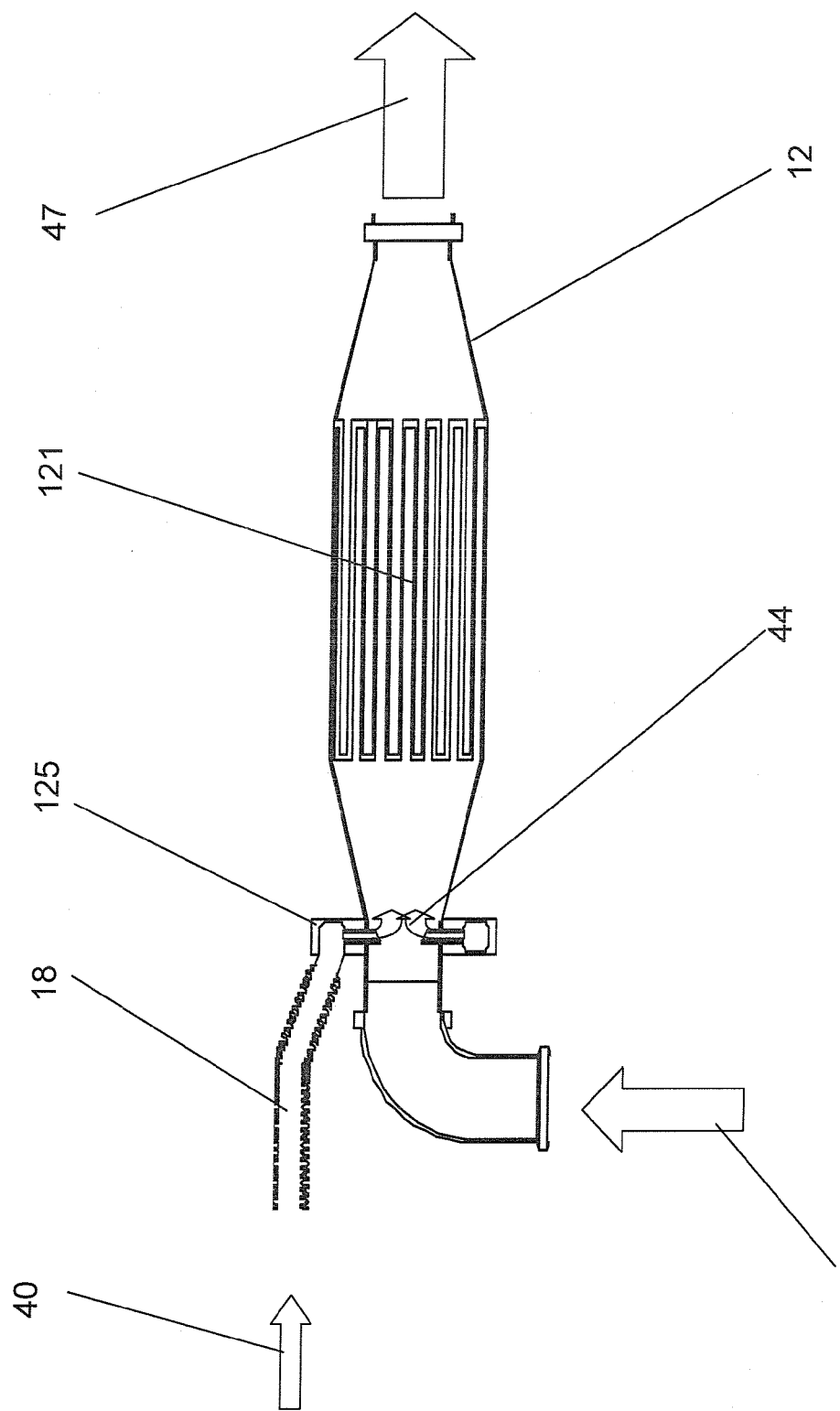
FIG. 12 is a schematic depicting a typical DPF with the low thermal inertia bypass tube directing the bypass gas into a diffusing nozzle.

In yet another embodiment the low thermal inertia, well insulated turbocharger bypass duct (18) is used to direct the non-heat diluted exhaust gas into a nozzle upstream of the DPF ceramic matrix. FIG. 12 depicts a method in which the 'hot' exhaust gas (40) flowing in the low thermal inertia, well insulated duct (18) emerges from the duct (18) at a location (125) in a direction (44). A plurality of tubes, which can be of different lengths, in the nozzle may also be at different angles from perpendicular to the incoming flow (41) to inclined in the direction of the incoming flow (41). In this embodiment the mixing action is generated by vortex shedding in the wake of the injector tubes.

Figure 13:
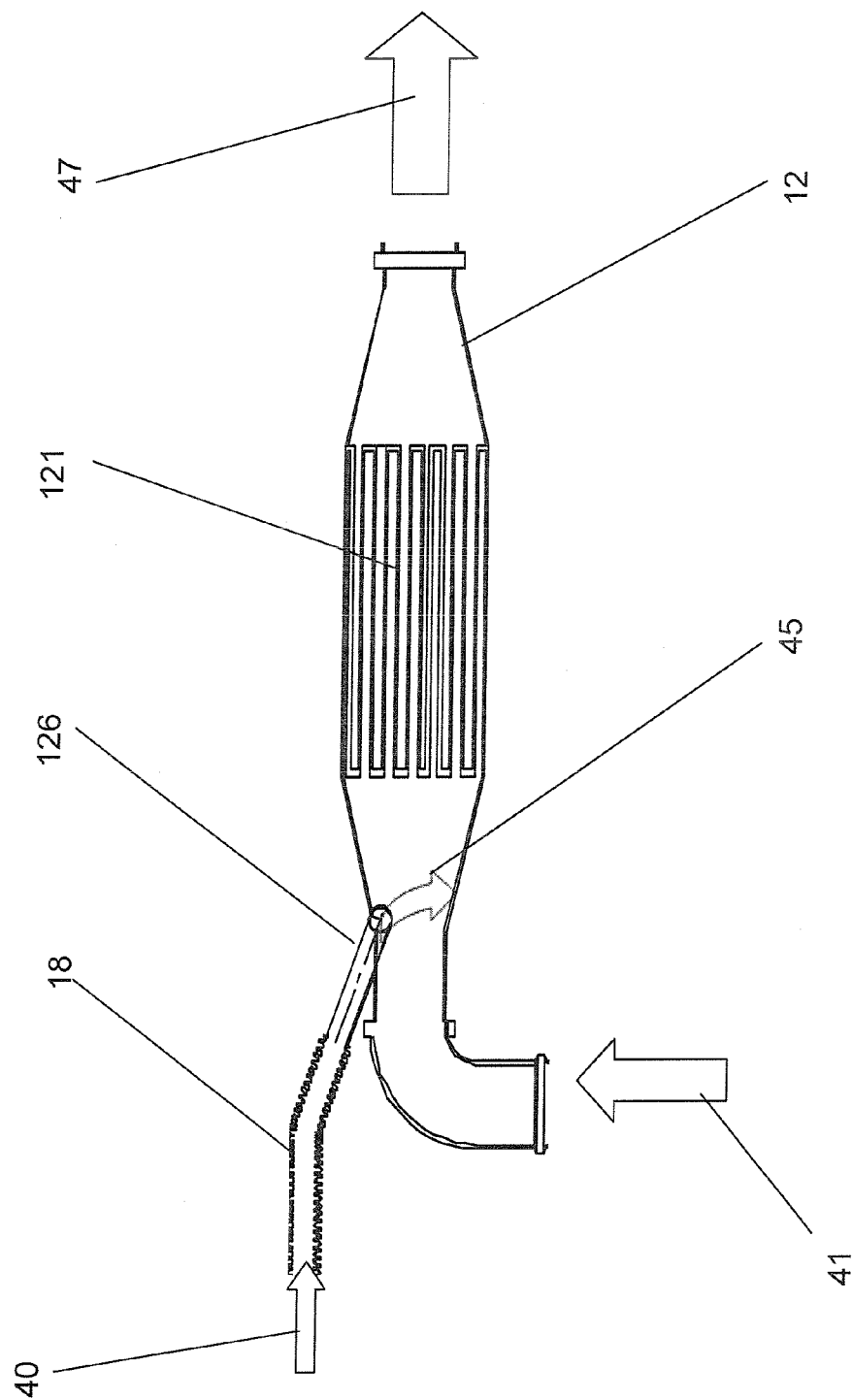
FIG. 13 is a schematic depicting a typical DPF with the low thermal inertia bypass tube directing the bypass gas tangentially into the DPF.

In yet another embodiment of this design the low thermal inertia, well insulated turbocharger bypass duct (18) is used to direct the non-heat diluted exhaust gas into a nozzle upstream of the DPF ceramic matrix. FIG. 13 depicts a method in which the 'hot' exhaust gas (40) flowing in the low thermal inertia, well insulated duct (18) emerges from the duct (18) at a location (126) in a direction (45) tangential to the center line of the DPF housing. In this embodiment the mixing action is generated by the tangential swirl (45) in the duct upstream of the DPF ceramic matrix.

Figure 14:
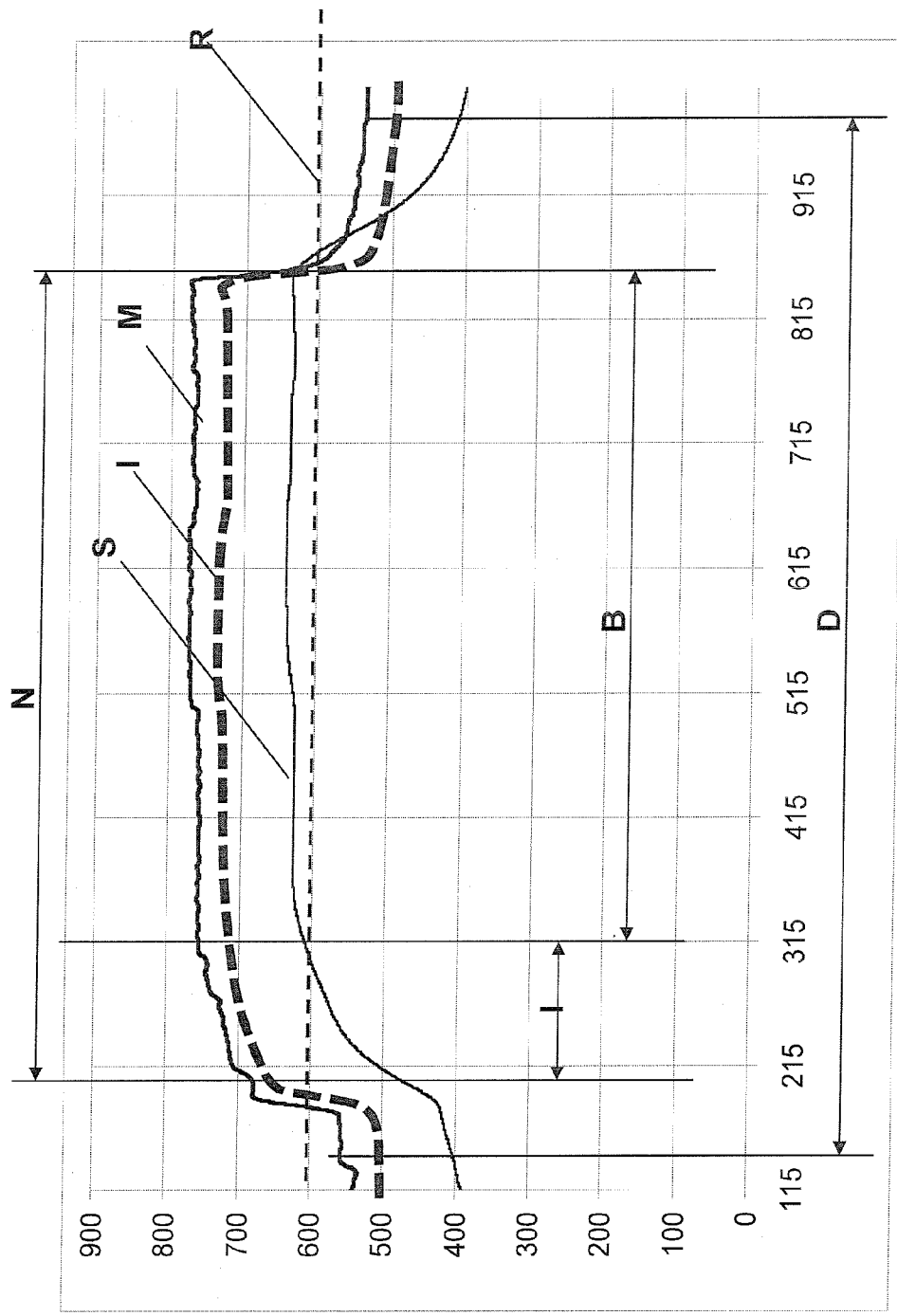
FIG. 14 is a chart showing the benefit of the low thermal inertia bypass.
Figure 15:
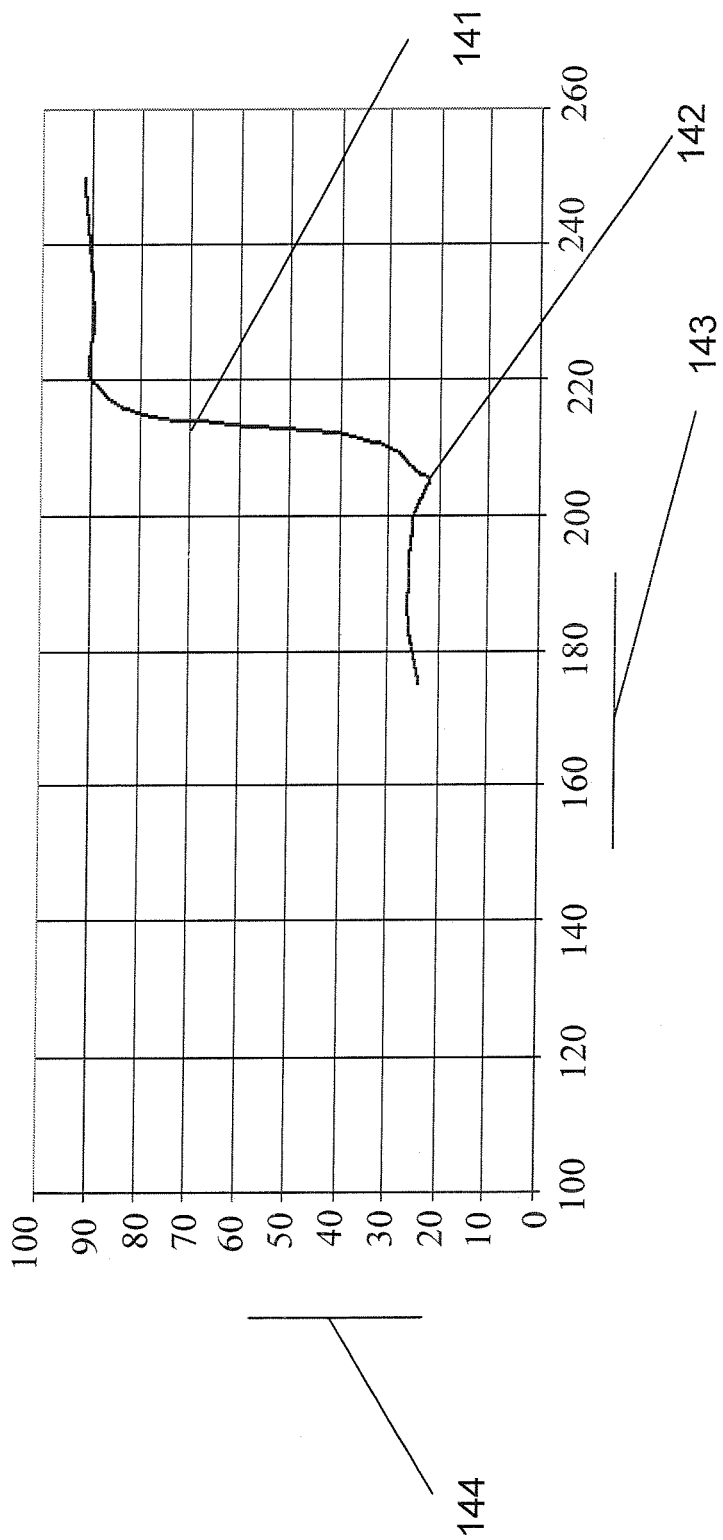
FIG. 15 is a chart showing the relationship between the effectivity of a catalyst and gas temperature.

The chart in FIG. 14 shows the period availability for regeneration in a test. The X axis is the duration available in seconds; the Y axis is temperature in degrees centigrade at a point in front of the DPF matrix. 550° C. to 600° C. is the critical temperature for regeneration in the DPF under study.

Trace "M" is the temperature of the exhaust gas upstream of the turbine wheel.

Trace "S" is the temperature seen immediately in front of the DPF in the normal configuration.

Trace "I" is the temperature of the exhaust gas seen immediately in front of the DPF using the low thermal inertia bypass duct.

Line "R" is the threshold temperature for soot burning.

The duration marked "D" is the duration (100%) of the entire, commanded regeneration cycle.

The duration marked "B" is the duration of a typical (and the test) standard DPF configuration where the temperature in front of the DPF is >600° C., the threshold temperature for soot burning.

The duration marked "N" is the duration in which the temperature in front of the DPF matrix is >600° C. with the simple case of the invention, in FIG. 3, in place. (the after-treatment configuration is assumed a standard vehicle configuration and a low thermal inertia, insulated bypass pipe ducts the regeneration exhaust gas from the exhaust manifold to the DPF diffusion cone in front of the DPF matrix.

The period "I" is the improvement in the time available for regeneration. "I" is the difference between the standard configuration "B" and the new configuration "N". So effectively the period "I" is the time improvement due the invention.

From this chart it can be seen that the usable regeneration period "B" for the standard configuration is 555 seconds, or 62.5% of the available period, whereas the usable regeneration period for the configuration using the low thermal inertia, insulated bypass is 675 seconds, or 76.7% of the available period, and increase of 21.6%. This would be roughly equivalent to a reduction of 21.6% in thermal inertia of the turbochargers, a huge reduction.

Figure 17:
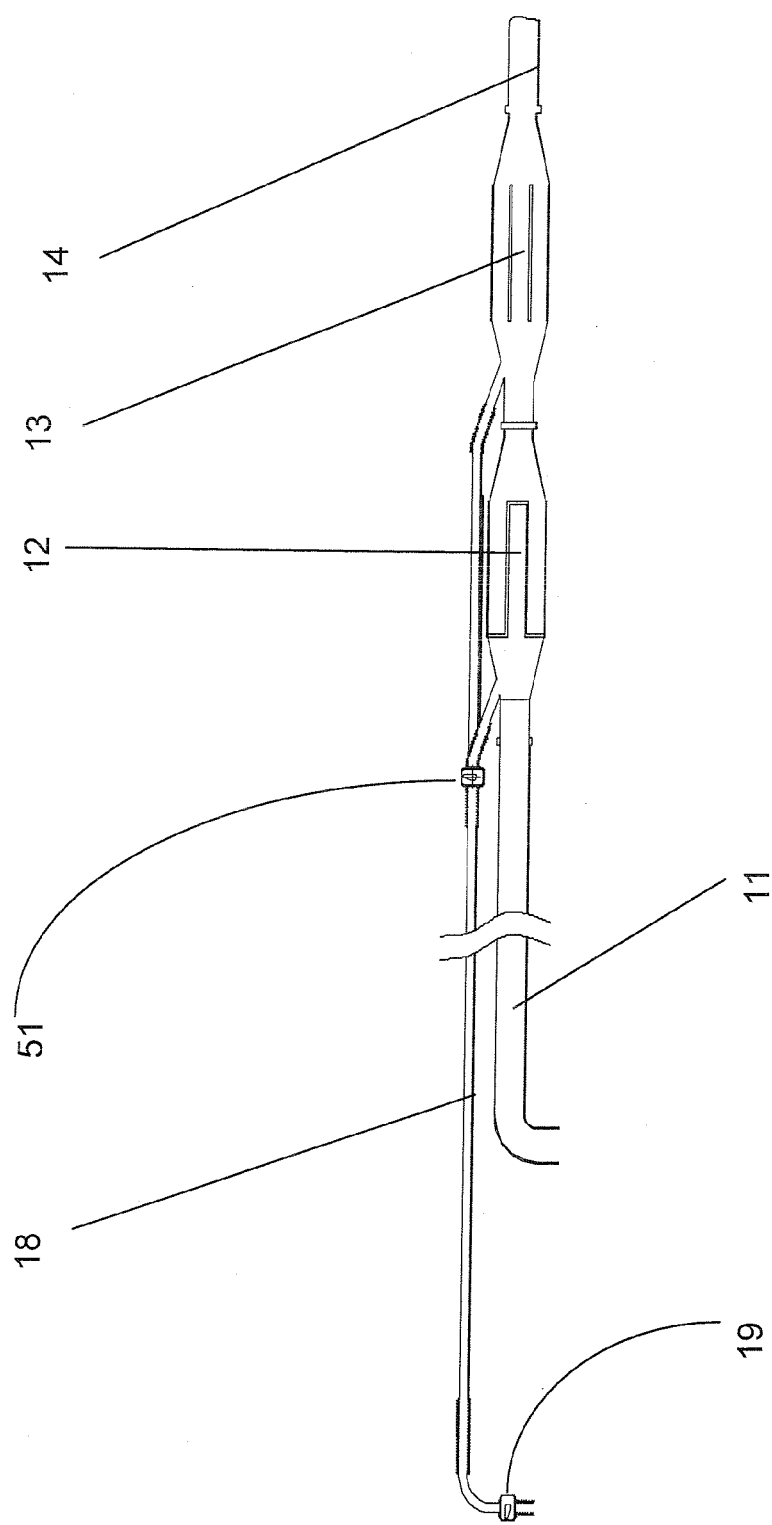
FIG. 17 is a schematic of the exhaust system with an optional valve at the DPF.

Using the same logic as that used for DPF regeneration above, the inventors realized that the same low thermal inertia bypass system used for rapid DPF regeneration could be used to solve the problem of catalyst light off during cold start up. As shown in FIG. 17 the low thermal inertia, well insulated turbocharger bypass duct (18) is used to direct the non-heat diluted (heat conserved) exhaust gas into either, or both, the DPF (12) or the catalyst (13). The flow of heated, un-diluted gas is controlled by both the control valve (19) which admits a flow of hot exhaust gas into the low thermal inertia, well insulated turbocharger bypass duct (18). The control valve (51) at the entrance to the DPF can be configured to admit flow to the DPF, for regeneration, or to admit flow to the catalyst for early light-off. Since the cold start-up condition is not likely to conflict with a DPF regeneration cycle, there should be no requirement for the flow from the low thermal inertia, well insulated duct to provide hot exhaust gas to both the DPF and the catalyst. In the vehicle business, the same engine is often used in many different vehicles. The same basic engine which is used in a dump truck may be used in a cruising yacht or an excavator. In the automobile business the same engine used in a 4 seat car may be used in a van or an SUV. Because of this broad usage it is impossible to define the length of an engine exhaust pipe, (in this case from the turbocharger to the DPF), or in the case of the invention, the length of the low thermal inertia, insulated, turbocharger bypass duct for all vehicles.

The basic idea of the invention is to provide the exhaust system with a first flow path going through the turbocharger, and a second "bypass" flow path through a conduit specifically designed to be as low in thermal inertia as possible. As a rule of thumb, a "low thermal inertia bypass pipe" can be defined in terms of the ratio of weight of a defined length of bypass to the weight of the turbine housing, wherein the defined length is proportional to the diameter of the turbine wheel.

Alternatively, the low thermal inertia bypass pipe can be defined in terms of weight of first branch to weight of second branch, from the point of the split the point of merging. The first branch includes exhaust piping from the split to the turbine housing, includes the weight of the turbine housing, and the weight of the downpipe and exhaust pipe to the point of merger. Under this method of measurement, the weight of the bypass pipe is from 1% to 10% of the weight of the turbocharger branch.

As a more scientific form of measurement, the bypass pipe can be defined in terms of the length of the low thermal inertia turbocharger bypass duct as being from the source of exhaust gas upstream of the turbocharger, from either the manifold, as shown in FIG. 3 or from just upstream of the turbocharger, as shown in FIG. 5 and the termination of the bypass duct being the same distance from the nose of the turbine wheel as the interface of exhaust pipe (18) to the downstream turbine housing (1).

Using this definition to cover all turbochargers—from fixed turbochargers to regulated two stage turbochargers-:

The ratio of the weight of the cast Iron low thermal inertia, insulated, turbocharger bypass duct of the above-defined length to the diameter of the turbine wheel is from (0.005 to 0.020) (really 0.006 to 0.017); and The ratio of the thin walled SS low thermal inertia, insulated, turbocharger bypass duct to the diameter of the turbine wheel is from 0.0001 to 0.00025 (really 0.0001 to 0.00021)

Although a vehicle engine system has been described herein with great detail with respect to an embodiment suitable for the automobile or truck industry, it will be readily apparent that the turbocharger system including low thermal energy, insulated turbine bypass piping is suitable for use in a number of other applications. Although this invention has been described in its preferred form with a certain of particularity with respect to diesel particulate filters and catalytic converters, it is understood that the present disclosure of the preferred form has been made only by way of example and that numerous changes in the details of structures and the composition of the combination may be resorted to without departing from the spirit and scope of the invention.

Now that the invention has been described, we claim:
1. A vehicle engine system including:
   an internal combustion engine (100) including an intake manifold (22) and an exhaust manifold (7),
   at least one turbocharger including a turbine housing, said turbine housing having an inlet and an outlet, said inlet in communication with and located downstream of the exhaust stream of said exhaust manifold (7),
   at least one aftertreatment device (12, 13) located in said exhaust stream downstream of said turbocharger, said aftertreatment device having an inlet and an outlet,
   bypass piping (18) connecting exhaust flow upstream of said turbocharger with exhaust flow downstream of said turbocharger and upstream of said aftertreatment device,
   bypass valving (9, 19) for selectively controlling the flow of at least a portion of exhaust gas around said turbine housing,
   wherein the inner surface area of the bypass piping is 1-25% of the inner surface area of the turbine housing,
   wherein the length of the bypass piping is 200 cm or less, and
   wherein the metal weight of the bypass piping is 0.1 to 3% of the weight of the turbine housing.
2. The vehicle engine system as in claim 1, wherein said aftertreatment device includes a housing having an inlet and an outlet, and wherein said bypass piping (19) introduces exhaust flow into the exhaust stream within 5 cm of the aftertreatment device housing inlet.
3. The vehicle engine system as in claim 1, wherein said aftertreatment device includes a housing having an inlet and an outlet, and wherein said bypass piping (19) introduces exhaust flow into the aftertreatment device downstream of the aftertreatment device housing inlet.
4. The vehicle engine system as in claim 1, wherein the inner surface area of the bypass piping is 5-25% of the inner surface area of the turbine housing, the length of the bypass piping is 100 cm or less, and the metal weight of the bypass piping is 0.1 to 1.5% of the weight of the turbine housing.
5. The vehicle engine system as in claim 1, wherein the inner surface area of the bypass piping is 5-25% of the inner surface area of the turbine housing, the length of the bypass piping is 50 cm or less, and the metal weight of the bypass piping is 0.1 to 0.5% of the weight of the turbine housing.
6. The vehicle engine system as in claim 1, wherein said bypass piping is thermally insulated.
7. The vehicle engine system as in claim 1, wherein said aftertreatment device is at least one of Diesel Particulate Filter (DPF) (12), a Diesel Oxidation Catalyst, a particle filter regeneration device, a windshield defroster, or a catalytic converter.

8. The vehicle engine system as in claim 7, wherein said bypass piping (18) is arranged to direct exhaust gas to one or both of the DPF (12) and the catalytic converter (13).

9. The vehicle engine system as in claim 1, wherein said bypass piping (18) is an iron-based superalloy material containing one or more of Ti, Nb, B, Hf and Zr, or stainless steel.

10. The vehicle engine system as in claim 9, wherein said bypass piping (18) is a flexible, corrugated duct of a superalloy material selected from SUH660, Inconel 713C, and Incoloy 800H.

11. The vehicle engine system as in claim 1, wherein said aftertreatment device is a Diesel particulate filter (DPF) (12), wherein said system further includes an exhaust gas recirculation (EGR) system, and wherein said bypass valving (10) is adapted to control exhaust gas flow for EGR as well as to control exhaust gas flow through the bypass duct (19) to the DPF (12) during regeneration periods.

12. The vehicle engine system as in claim 1, comprising first and second turbochargers arranged in series, wherein said bypass piping bypasses both said turbochargers.

\* \* \* \* \*